United States Patent
Collins et al.

(10) Patent No.: US 12,062,761 B2
(45) Date of Patent: Aug. 13, 2024

(54) FABRICATION OF ALL-SOLID-STATE ENERGY STORAGE DEVICES

(71) Applicant: International Business Machines Corporation, Armonk, NY (US)

(72) Inventors: John Collins, Tarrytown, NY (US); Mahadevaiyer Krishnan, Hopewell Junction, NY (US); Stephen Bedell, Wappingers Falls, NY (US); Adele L Pacquette, Elmsford, NY (US); John Papalia, New York, NY (US); Teodor Todorov, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 17/321,555

(22) Filed: May 17, 2021

(65) Prior Publication Data
US 2021/0280916 A1 Sep. 9, 2021

Related U.S. Application Data

(62) Division of application No. 16/238,319, filed on Jan. 2, 2019, now Pat. No. 11,031,631.

(51) Int. Cl.
*H01M 10/0585* (2010.01)
*H01M 4/70* (2006.01)
(Continued)

(52) U.S. Cl.
CPC ... *H01M 10/0585* (2013.01); *H01M 10/0525* (2013.01); *H01M 50/555* (2021.01)

(58) Field of Classification Search
None
See application file for complete search history.

(56) References Cited

U.S. PATENT DOCUMENTS

| 9,107,335 B2 | 8/2015 | Lemke et al. |
| 9,728,494 B2 | 8/2017 | Biederman et al. |

(Continued)

FOREIGN PATENT DOCUMENTS

| EP | 2 884 573 | 6/2015 |
| WO | 2018002302 | 1/2018 |

OTHER PUBLICATIONS

Cheng, L. et al. The origin of high electrolyte-electrode interfacial resistances in lithium cells containing garnet type solid electrolytes. Phys. Chem. Chem. Phys. 16, 18294-18300 (2014).

(Continued)

*Primary Examiner* — Yoshitoshi Takeuchi
(74) *Attorney, Agent, or Firm* — Sam Waldbaum

(57) ABSTRACT

A semiconductor device structure and method for forming the same is disclosed. The structure incudes a silicon substrate having at least one trench disposed therein. An electrical and ionic insulating layer is disposed over at least a top surface of the substrate. A plurality of energy storage device layers is formed within the one trench. The plurality of layers includes at least a cathode-based active electrode having a thickness of, for example, at least 100 nm and an internal resistance of, for example, less than 50 Ohms/cm². The method includes forming at least one trench in a silicon substrate. An electrical and ionic insulating layer(s) is formed and disposed over at least a top surface of the silicon substrate. A plurality of energy storage device layers is formed within the trench. Each layer of the plurality of energy storage device layers is independently processed and integrated into the trench.

12 Claims, 12 Drawing Sheets

(51) Int. Cl.
  *H01M 10/0525* (2010.01)
  *H01M 10/0562* (2010.01)
  *H01M 10/058* (2010.01)
  *H01M 50/555* (2021.01)

(56) References Cited

U.S. PATENT DOCUMENTS

| | | |
|---|---|---|
| 2008/0032236 A1 | 2/2008 | Wallace et al. |
| 2010/0233548 A1 | 9/2010 | Pijnenburg et al. |
| 2012/0052382 A1* | 3/2012 | Yoshida ............... H01M 4/139 429/211 |
| 2013/0260183 A1* | 10/2013 | Ellis-Monaghan ......................... H01M 10/425 429/7 |
| 2014/0233200 A1 | 8/2014 | Lemke et al. |
| 2015/0084157 A1 | 3/2015 | Tegen et al. |
| 2017/0092566 A1 | 3/2017 | Biederman et al. |
| 2017/0271649 A1 | 9/2017 | Vereecken et al. |
| 2017/0271722 A1* | 9/2017 | Ehm ................... H01M 10/425 |
| 2019/0157670 A1 | 5/2019 | Wolter et al. |

OTHER PUBLICATIONS

Choi, K.-H., Jeon, J.-H., Park, H.-K. & Lee, S.-M. Electrochemical performance and thermal stability of LiCoO2 cathodes surface-modified with a sputtered thin film of lithium phosphorus oxynitride. J. Power Sources 195, 8317-8321 (2010).

Ding, F. et al. Dendrite-Free Lithium Deposition via Self-Healing Electrostatic Shield Mechanism. J. Am. Chem. Soc. 135, 4450-4456 (2013).

Ferrari, S. et al. Latest advances in the manufacturing of 3D rechargeable lithium microbatteries. J. Power Sources 286, 25-46 (2015).

Fu, K. (Kelvin) et al. Toward garnet electrolyte-based Li metal batteries: An ultrathin, highly effective, artificial solid-state electrolyte/metallic Li interface. Sci. Adv. 3, e1601659 (2017).

Hahn, R., Marquardt, K., Thunman, M. & al, et. Silicon integrated micro batteries based on deep reactive ion etching and through silicon via technologies. in IEEE 62nd Electronic Components and Technology Conference, ECTC 2012 1571-1577 (2012).

Han, F., Gao, T., Zhu, Y., Gaskell, K. J. & Wang, C. A Battery Made from a Single Material. Adv. Mater. Deerfield Beach Fla 27, 3473-3483 (2015).

Han, X. et al. Negating interfacial impedance in garnet-based solid-state Li metal batteries. Nat. Mater. advance online publication, (2016).

Limthongkul, P., Jang, Y.-I., Dudney, N. J. & Chiang, Y.-M. Electrochemically-driven solid-state amorphization in lithium-silicon alloys and implications for lithium storage. Acta Mater. 51, 1103-1113 (2003).

Long, J. W., Dunn, B., Rolison, D. R. & White, H. S. Three-Dimensional Battery Architectures. Chem. Rev. 104, 4463-4492 (2004).

Neudecker, B. J., Dudney, N. J. & Bates, J. B. "Lithium-Free" Thin-Film Battery with In Situ Plated Li Anode. J. Electrochem. Soc. 147, 517-523 (2000).

Noked, M. et al. Electrochemical Thin Layers in Nanostructures for Energy Storage. Acc. Chem. Res. 49, 2336-2346 (2016).

Ruzmetov, D. et al. Electrolyte Stability Determines Scaling Limits for Solid-State 3D Li Ion Batteries. Nano Lett. 12, 505-511 (2012).

Sakuda, A., Hayashi, A. & Tatsumisago, M. Sulfide Solid Electrolyte with Favorable Mechanical Property for All-Solid-State Lithium Battery. Sci. Rep. 3, (2013).

Sakuda, A., Takeuchi, T. & Kobayashi, H. Electrode morphology in all-solid-state lithium secondary batteries consisting of LiNi1/3Co1/3Mn1/3O2 and Li2S—P2S5 solid electrolytes. Solid State Ion. 285, 112-117 (2016).

Singh, M., Kaiser, J. & Hahn, H. A systematic study of thick electrodes for high energy lithium ion batteries. J. Electroanal. Chem. 782, 245-249 (2016).

Wu, H. & Cui, Y. Designing nanostructured Si anodes for high energy lithium ion batteries. Nano Today 7, 414-429 (2012).

Silicon Substrate Containing Integrated Porous Silicon Electrodes for Energy Storage Devices U.S. Appl. No. 16/032,317, filed Jul. 11, 2018.

Battery Structure With an Anode Structure Containing a Porous Region and Method of Operation U.S. Appl. No. 16/026,461, filed Jul. 3, 2018.

Through Silicon Via Energy Storage Devices U.S. Appl. No. 16/238,389, filed Jan. 2, 2019.

Song et al., "Solid-state microscale lithium batteries prepared with microfabrication processes", Journal of Micromechanics and Microengineering, Mar. 2009.

List of IBM Patents or Patent Applications Treated as Related.

* cited by examiner

Trench Base Current Collector Mask 1102

Anode Mask 1104

Interfacial Additive Mask 1106

Electrolyte Mask 1108

Cathode Mask 1110

Topside Current Collector Mask 1112

FABRICATION OF ALL-SOLID-STATE ENERGY STORAGE DEVICES

BACKGROUND OF THE INVENTION

The present disclosure generally relates to the field of semiconductor devices, and more particularly relates to energy storage devices.

Exponential growth in portable electronic devices has created significant interest in compact batteries or energy storage devices offering high energy capacity and power. Lithium-ion batteries provide higher energy density compared with other rechargeable battery systems such as lead-acid, nickel-cadmium and nickel-metal hydride batteries.

SUMMARY OF THE INVENTION

In one embodiment, a method for forming a semiconductor device structure is disclosed. The method comprises forming at least one trench in a silicon substrate. The at least one trench provides an energy storage device containment feature. An electrical and ionic insulating layer is formed and disposed over at least a top surface of the silicon substrate. A plurality of energy storage device layers is formed within the at least one trench. Each layer of the plurality of energy storage device layers is independently processed and integrated into the at least one trench. Thermal, electrical, and pressure parameters of the independently processed layers are controlled by sidewalls and a base of the at least one trench. The independent processing of each layer enables control of full cell performance properties, such as but not limited to: densification, energy density, ionic conductivity, capacity, molecular structure, interlayer chemical cross-linking, interlayer adhesion, electrolyte glass structure transitioning, composite electrode, electrolyte and/or unit cell fabrication, etc.

In another embodiment, a method of forming a semiconductor device structure is disclosed. The method comprises forming at least one trench in a silicon substrate. The at least one trench provides an energy storage device containment feature. At least one electrical and ionic insulating layer is formed and disposed over at least a top surface of the silicon substrate. One or more through silicon vias through at a base of the at least one trench. The one or more through silicon vias are filled with a metal material. A first portion of the metal material extending above the base of the at least one trench and a second portion of the metal material extending below a bottom surface of the silicon substrate are planarized. The planarized first portion of the metal material forms a trench base current collector and the planarized second portion of the metal material forms a backside current collector. A plurality of energy storage device layers is formed within the at least one trench over the trench base current collector. Each layer of the plurality of energy storage device layers is independently processed and integrated into the at least one trench.

In another embodiment, a semiconductor device structure is disclosed. The semiconductor device structure comprises at least the following features. A silicon substrate having at least one trench disposed therein. The at least one trench provides an energy storage device containment feature. An electrical and ionic insulating layer or multilayer is disposed over at least a top surface of silicon substrate. A plurality of energy storage device layers is disposed within the at least one trench. The plurality of energy storage device layers comprises at least a cathode-based active electrode having a thickness of at least 100 nm and an internal resistance of less than 150 Ohms/cm$^2$.

In a further embodiment, an integrated circuit is disclosed. The integrated circuit comprises an energy storage device. The energy storage device comprises at least the following features. A silicon substrate having at least one trench disposed therein. The at least one trench provides an energy storage device containment feature. An electrical and ionic insulating layer or multilayer is disposed over at least a top surface of silicon substrate. A plurality of energy storage device layers is disposed within the at least one trench. The plurality of energy storage device layers comprises at least a cathode-based active electrode having a thickness of at least 100 nm and an internal resistance of less than 150 Ohms/cm$^2$.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
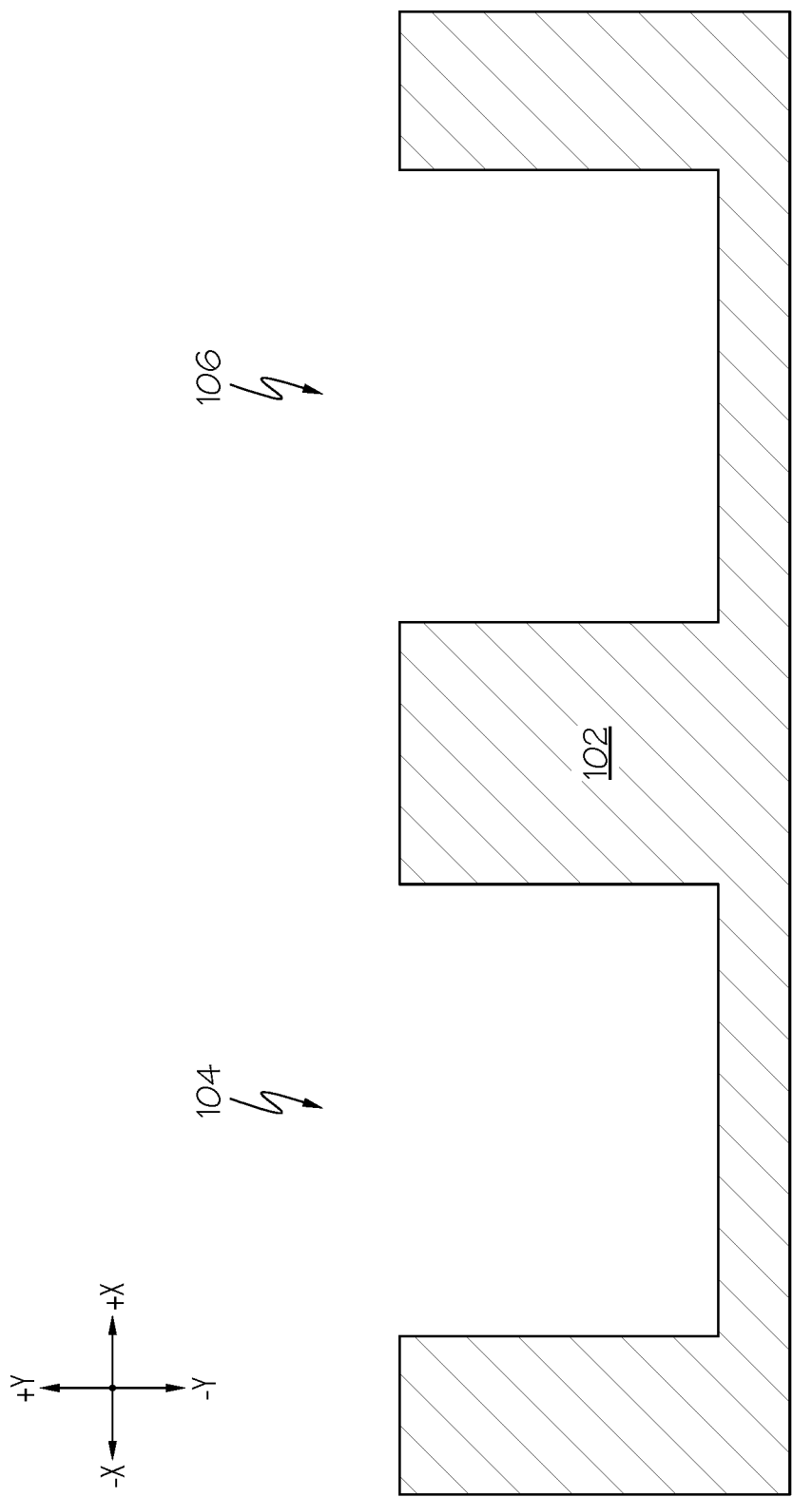
FIG. 1 is a cross-sectional view of a semiconductor structure after plurality of trenches have been formed in a substrate according one embodiment of the present invention.

Illustrative embodiments of the invention may be described herein in the context of illustrative methods for forming energy storage devices, along with illustrative apparatus, systems and devices formed using such methods. However, it is to be understood that embodiments of the invention are not limited to the illustrative methods, apparatus, systems and devices but instead are more broadly applicable to other suitable methods, apparatus, systems and devices.

It is to be further understood that the present disclosure will be described in terms of a given illustrative architecture; however, other architectures, structures, substrate materials and process features and steps may be varied within the scope of the present disclosure.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The integration of batteries, or more generally energy storage devices, in microprocessor and memory chips is a significant requirement for Internet of Things (IOT) devices and other applications. IoT and other types of devices may require high capacity and power density from miniaturized energy storage devices embedded in complementary metal-oxide-semiconductor (CMOS) circuits. It is anticipated that, over the next generation, required energy consumption for electronic devices will decrease as various human controlled and autonomous devices will become increasingly miniaturized. For example, power consumption for some IoT devices is expected to be lower than one Watt. Emerging applications requiring such on-board next generation energy storage devices include IoT devices, mobile devices, sensory equipment, and various autonomous environment, biological and social functioning machines. Smart dust and biomedical sensory and drug delivery devices are examples of such functional devices.

Existing energy storage devices that are primarily associated with such applications often take the form of thin or thick film battery devices and have drawbacks in several key areas. Conventional micro-battery technology, where the enabling of high capacity, high power density rechargeable lithium based energy storage devices, with simple cost and performance effective encapsulation and packaging capabilities is well behind that of conventional sized (>20 mm diameter) energy storage devices. Also, such conventional energy storage devices usually do not possess or provide high-power density function or long energy delivery (e.g., high energy capacity) capabilities. Further, conventional energy storage devices are generally not able to be integrated into single, small volume, low weight dimensions. Conventional energy storage devices also typically utilize liquid electrolytes, which have inherent safety hazards, particularly the organic components of liquid electrolytes which are highly flammable. Conventional energy storage devices usually lack durability and sustainable encapsulation and packaging (e.g., conventional housing units lack sufficient puncture resistance or degrade upon use, thus opening to the outside environment and flooding the flammable components with oxygen). Further, processing method limitations constrain the ability to fabricate energy storage device active layers (either independently or when integrated into an energy storage housing unit or device) in an in-situ fashion.

Conventional lithium metal electrode-based energy storage devices also have significant drawbacks. For example, conventional devices with lithium metal electrodes often suffer from incomplete or lack of lithium metal spatial control when device use is underway, thereby creating potential cell failing/cell exploding Li-dendritic structures; suffer from an unsaturated, high impedance lithium metal interface between electrolyte and electrode materials; and suffer from incomplete or lack of densely packed and/or layered lithium metal material, and suitable charge localization.

Further, conventional devices often have ineffective electrode substrates or treated electrode surfaces and thus do not enable stable formation and in-situ planarization of lithium metal resulting in desorption/delamination between solid electrolyte and lithium metal, or lithium metal dendrite formation, creating the inefficiencies and hazards described above. Ineffective electrode materials or treated electrode surfaces also prevent the formation of suitable nucleation or lithium hosting sites, thereby limiting the performance of lithium or electrode material created in-situ. Ineffective electrode substrates or treated electrode surfaces can also lead to disadvantages in that they are unable to compensate for or prevent electrochemical cell degradation during volume changes in electrode and/or electrolyte materials throughout the unit cell during charge and discharge processes.

Conventional all-solid state energy storage devices have significant drawbacks as well. For example, conventional all-solid state energy storage devices generally have problems in their ability to maintain low interfacial resistance between independent active energy storage/energy mobile layers. In addition, conventional fabrication methods for these devices have problems with creating thick cathode materials as many thick cathode containing cells contain high internal resistance or low electrochemically accessible cathode surface area, which limits both power and capacity performance of the cell. Additionally, conventional all-solid state energy storage devices have issue with maintaining electrochemically (ionically) labile interfaces between electrolyte and electrode materials due to insufficient chemical bonding and/or interlayer adhesion at the electrolyte/electrode interface, thereby leading to high interfacial resistance, low capacity and irreversible parasitic, cell-degrading reactions.

Thus, conventional solutions lack adequate energy storage device housing units that facilitate both the fabrication and integration of energy storage device active layers while also effectively encapsulating the energy storage device active layers from the potentially destructive external environment.

Techniques are thus needed for integration of performance enhancing energy storage device housing units and encapsulating components with active electrode components which act as stable charge host sites for rechargeable lithium based charge storage. Some embodiments provide techniques for forming energy storage devices that are based on silicon substrates that act as both the energy storage device housing unit (e.g., for the containment of active components of the energy storage device) and provide treated (e.g., porous) silicon-based active electrode layers integrated together from a single stand-alone silicon raw material.

One impediment to accomplishing the above are the methods by which the energy storage device components are integrated together; specifically, how these methods affect the cross-linking and adhesion between interfaces which facilitate ion-charge transfer throughout the electrochemical components of the cell. The physical and chemical conditions of how electrochemically active energy storage components are synthesized as well as 'bonded' together determines their performance capabilities within a fully capable and effective energy storage device. One method to achieve high performing energy storage device components is to administer the synthesis and bonding of energy storage device components during component layer integration. As the physical and chemical conditions of each component layer is altered, especially in regard to the solid/semi-solid electrolyte, interfacial additives and plasticizer materials, the inter-layer bonding capabilities as well as charge-transport-conductive properties of the respective component layer may be enhanced to create a highly interfacial-dependent and efficient solid state/semi-solid state energy storage device that is enables a high degree of interlayer electrochemical connection and results in a composite-type (electrode/electrolyte/additive intermixed) full energy storage cell. Such an efficient solid state/semi-solid-state energy storage device illustrates very low interfacial-induced charge-blocking resistance.

The independent treatment of each component layer within an electrically and ionically insulated energy storage housing unit can facilitate the fabrication of highly efficient working energy storage devices. Embodiments of the present invention provide examples of such independent component layer treatment methods and enabling improvements in general capacity/power density, lifecycle, internal resistance, interfacial resistance, cell composite makeup, layer densification, component molecular structure, interlayer adhesion and interfacial chemical bonding.

As will be discussed in greater detail below, embodiments, provide electrically and ionically-insulated and hermetically sealed silicon-based energy storage housing units. One or more embodiments utilize treated (e.g., porous-silicon) as a charge-hosting electrode material for the storage of Lithium based charge via stable planarized dendrite or Li-plated material formation. Some embodiments fabricate porous silicon electrode material and integrate this material into the silicon framework of one or more embodiments. Spalling methods may be utilized to create free standing, porous silicon electrode/current collector material, which may be integrated with/on/into electrochemically active and inactive components of energy storage devices.

One or more embodiments provide an effective method for the integration and layer/interlayer-processing (during-multi-layer integration) of energy storage device electrochemically active and inactive components. The electrochemically active components may include electrode materials, interfacial resistance-lowering additives, inter-electrode stabilizing/adhesive/conductive additives, metal-oxide(s), electrolytes, electrolyte/additive/electrode material composites, and charge-host materials. The inactive components include environmental and cell leakage barriers, current collector material(s), two-dimensional and three-dimensional (3D) substrate surfaces.

One or more embodiments increase the electrochemical performance of energy storage devices through the use of composite electrodes, composite electrolytes, and/or composite interfacial additive(s). Embodiments enhance ion diffusion capability, lower interfacial impedance, electrode/cell internal resistance, prevent or suppress degradative parasitic reactions at between interlayers and increase overall mobile charge transport processes in all-solid state and semi-solid state lithium-ion energy storage systems.

One or more embodiments provide a processing and integration method that enables a high degree of physical, chemical, and molecular interconnectivity between electrochemically active and/or inactive energy storage device components. Embodiments utilize encapsulated and hermetically-sealed energy storing housing units that facilitate the integration and material processing of active layer components integrated together with inactive layer components, for use in advanced all solid state, hybrid solid, or liquid/solid energy storage devices.

At least some embodiments enable a significant increase in the consistent and rechargeable energy storage device capacity as well as power density through the integration of multiple chemically/mechanically connected and densified layers of cathode and/or cathode/electrolyte composite and/or cathode/electrolyte/additive composite materials via one or more of the following: consecutive, sequential, and independent stacking of said layers and independent processing of the multiple layers (processing conducting in-between layer stacking); manipulating the charge-storage magnitude, ionically-labile capability, electrically insulating capability, and chemical interconnectivity of the multiple layers through controlling the precise concentration ratios of cathode material/electrolyte material in addition to additive material, as well as electrochemically-accessible charge-storage capable surface area, in each independent layer of the electrochemically active energy storage device; manipulating the charge-storage magnitude, ionic conductivity, electric conductivity, and physical/chemical interconnectivity of said multiple layers through controlling the precise control of temperature, pressure, mechanical, physical, chemical, humidity and atmospheric conditions during the integration of one energy storage device layer with another; and/or utilization of spalling methods (in part or in-whole during the fabrication process and methods discussed herein) of the current described that may enable a viable process for the energetic, fabrication time and scale efficiency of all solid state or semi-solid state energy storage devices. The utilization of spalling methods in combination with the herein described processing of electrochemically active and inactive energy storage device components enables significant advances in the manufacturing efficiency of all solid state or semi-solid-state micro and macro scaled energy storage devices.

One or more embodiments utilize through-silicon-vias (TSVs) to further increase energy storage device performance. The relative dimensionality and three-dimensional features that comprise the energy storage device housing unit, sidewall and field insulating layer(s), current collectors, and environmental sealing agents may be manipulated in order to improve the energy density, power density, ionic conductivity, electrical conductivity and internal resistance of the fully finished all solid state or semi-solid state energy storage devices.

One or more embodiments utilize the metal platen created at the top of the TSV current collector structure/at the base of the 3D trench in order to fabricate advanced energy storage device layers and/or composite electrodes/composite cells. Due to the thermal and electrical conductive capability of the planarized metal platen (base of trench current collector), material processing may be conducted as the energy storage device is being fabricated via pressing (applied pressure conditions), hot pressing, isostatic pressing, electrically modulated pressing, and/or thermal control between the energy storage device (or independent energy storage device layer or multiple energy storage device layers) and the planarized metal plates.

Material processing such as the following (but not limited to) may be enabled by the respective embodiment: layer densification, cathode material densification, alteration of component layer molecular structure, crystalline structure, glass transition temperature (Tg) achievement, interlayer adhesion, interfacial chemical bonding (cross-linking), composite electrode fabrication through relatively thin layer independent processing (hot pressing), lower impedance/internal resistance composite electrode fabrication through relatively thin layer independent processing (hot pressing), interfacial additive thermal/pressure treatment for higher performance, etc. This respective embodiment enables a novel capability for the in-situ fabrication treatment of all solid state or semi-solid state batteries or microbatteries where the above physical/chemical/performance conditions may be controlled/tuned with the press/TSV platen system described, while also maintaining cell structure/dimensionality of composite electrodes while electrical/ionic insulation of the processed materials is controlled due to the insulated 3D trench sidewall structure.

At least some embodiments enable a significant decrease in the consistent and rechargeable, energy storage device internal resistance properties through the chemical and physical manipulation of interfaces present at the multiple layers of cathode and/or cathode/electrolyte composite and/or cathode/electrolyte/additive and/or anode/electrolyte and/or anode/electrolyte/additive and/or metal current collector/active energy storage device components via one or more of the following: the chemical and physical conditions applied to multiple active energy storage device components during their integration or layering process; the conditions as noted above applied in an iterative process during the integration of each independent layer or group of layers where the physical and chemical conditions applied are dependent on the physical and chemical properties of the layer(s) being integrated and also the physical and chemical properties of previously integrated layers; and/or the use of plating methods may also be utilized in for the creation of viable electronically-conductive current collectors as well as for use as environmental barriers that allow for the hermetic sealing of electrochemically active energy storage components.

Various embodiments may utilize patterned-type specific thicknesses of porous silicon in a non-porous silicon substrate, where the porous silicon acts as an electrode site for the reversible or rechargeable hosting of lithium metal charge storage. The respective patterned (e.g., isolated) type porous silicon embodiments are illustrated in the figures and described in further detail below. Techniques for forming blanket type porous silicon are disclosed in U.S. application Ser. No. 16/026,461, filed Jul. 3, 2018 and titled "Porous Silicon/Li-metal Electrode Fabrication for Applications in Rechargeable Solid State Energy Storage," U.S. application Ser. No. 16/026,448, filed Jul. 3, 2018 and titled "Kinetically Fast Charging High-Capacity Semiconductor Containing Energy Storage Device," U.S. application Ser. No. 16/026,426, filed Jul. 3, 2018 and titled "Method of Making an Anode Structure Containing a Porous Region," and U.S. application Ser. No. 16/026,473, filed Jul. 3, 2018 and titled "Rechargeable Lithium ion Battery with a Porous Semiconductor Anode", which are commonly assigned herewith and incorporate by reference herein in their entireties.

FIG. 1 shows a side cross-sectional view of a substrate 102 having trenches 104, 106 formed therein. The substrate 102, in one embodiment, may be a non-porous silicon (Si)-based substrate, a single-crystal non-porous Si substrate, a p+ type (e.g. Boron-doped) crystalline Si substrate, a P− type (e.g. undoped) Si Substrate, and/or the like. In one example, the substrate 102 may have a vertical thickness ranging from 10 μm to 700 μm although other thicknesses (e.g., <10 □m to >300 □m) are applicable as well. The horizontal width (in direction X-X') of the substrate 102 may vary, such as based on a number of energy storage devices that are to be formed.

In some embodiments, three-dimensional (3D) patterned porous silicon is formed from the substrate 102. This may involve: creating a region of p+ doped silicon using boron (B) ion implantation coupled with annealing utilizing a temperature range of 600 degrees Celsius (° C.) to 1200 (° C.) for a duration in the range of less than one minute to 12 hours, followed by electrochemical anodization; epitaxial growth followed by electrochemical anodization; or electrochemical anodization or electrochemical etching, such as in hydrofluoric acid (HF) on patterned, partially electronically and ionically insulated silicon substrates (e.g., thick (e.g. 300 nm to >500 nm) silicon nitride conformal coverage of the field and sidewall regions of the 3D silicon substrate). These processes enable formation of porous/non-porous silicon bilayers in a single substrate (e.g., in substrate 102) upon formation of 3D trenches 104, 106. The trenches 104, 106 may be formed utilizing etching, such as deep reactive-ion etching (D-RIE). More generally, any top-down method may be used to create the trenches 104, 106 by etching or removing a desired amount of the non-porous silicon substrate 102. Each of the trenches 104, 106 may have a horizontal width (in direction X-X') ranging from less than 5 μm to greater than 1 mm, and a vertical thickness or height (in direction Y-Y') ranging from less than 10 μm to greater than 400 μm, with the stipulation that the trench depth does not exceed approximately seventy percent of the thickness of the substrate 102. Although in other embodiments the trench depth may be greater than three-fourths of the thickness while maintaining structural integrity. The trenches may be rectangular, circular, etc. as desired. The trenches 104, 106 may also include small x-sections, deep "vias", and/or the like. As will be discussed in greater detail below, the trenches 104, 106 act as energy storage device containment features that will house multiple energy storage device layers.

Figure 2:
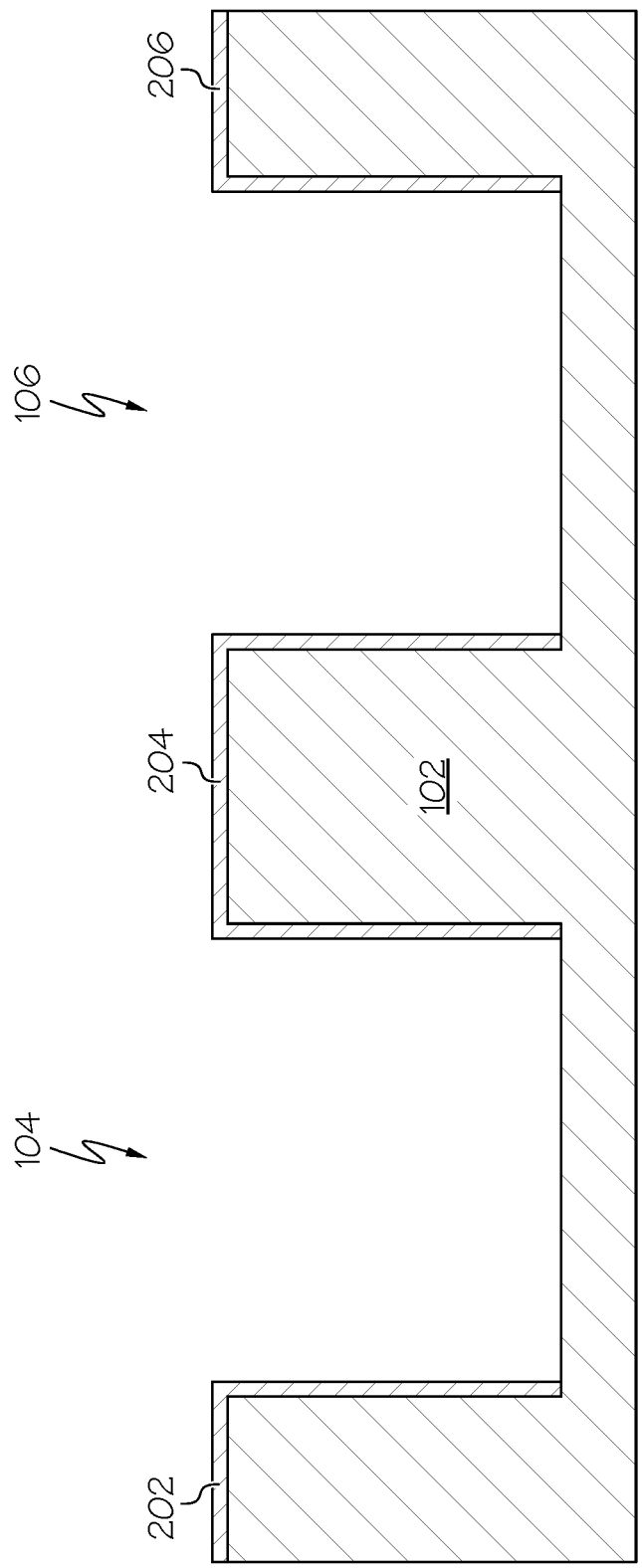
FIG. 2 is a cross-sectional view of the semiconductor structure after an electronic and ionic insulating layer or multilayer has been formed according one embodiment of the present invention.

FIG. 2 shows a cross-sectional view 200 of the FIG. 1 structure, following formation of an electronic and ionic insulating layer or multilayer 202 to 206. The insulating layer 202 to 206 may be conformally deposited on the 3D patterned trenches 104, 106 in substrate 102. insulating layer 202, 206 may be a single material (e.g. a material which is both electronic and ionic insulating), or multiple layered materials (e.g., an electronic insulating material and an ionic insulating material). Examples of materials that are both electronic and ionic insulating suitable for use as layer 202 to 206 include silicon nitride ($Si_3N_4$). For a layer 202 to 206 formed of multiple layers or materials, the electronic insulating material may be silicon dioxide ($SiO_2$) or $Si_3N_4$ and the ionic insulating material may be aluminum oxide (AlO) or thick (>200 nm) Lithium Fluoride (LiF) or silicon dioxide ($SiO_2$) or $Si_3N_4$.

It should be noted that the insulating layer 202 to 206, regardless of whether it is formed of a single or multiple materials or layers as described above, should maintain a sufficient thickness to provide both electrical and ionic insulating properties after the energy storage device has been formed and while the energy storage device is in constant electrochemical use, enabled via the techniques described in further detail below. In other words, the insulating layer 202 to 206 should not lose too much thickness during the additional processing required for formation of the energy storage device (e.g., during the various etching steps or processes described below) as well as during electrochemical cycling. If significant thickness of the layer or multilayer insulating material is lost during these processes, thicker insulating materials may need to be employed to maintain high energy storage device performance enabled through the isolation and insulation of the In-silicon energy storage device. Further, the material of layer or multilayer 202 to 206 should be resistant to etching in HF mediums when employing porous silicon fabrication methods described above.

The insulating layer 202 to 206 material may be deposited over the top of the FIG. 1 structure, using physical vapor deposition (PVD), atomic layer deposition (ALD), thermal oxide, chemical vapor deposition (CVS) or any other suitable oxide deposition processing technique. The insulating layer or multilayer 202 to 206, as shown in FIG. 2, covers the top surface of the substrate 102, and the sidewalls and bases of the trenches 104, 106. The insulating layer 202 to 206 may have a uniform thickness, such as in the range of less than 100 nm to greater than 600 nm.

The insulating layer material at the base of the trenches 104, 106 may be removed using etching, such as reactive-ion etching (RIE) and/or wet etching (e.g. using HF) to form patterned layers 202 to 206. Removal of the insulating layer material from the base of the trenches 104, 106 enables an electrical, as well as potentially ionic, connection between the backside of the substrate 102 and active battery material that is later filled in the trenches 104, 106. A resist or masking layer may be patterned on the top surface of the substrate and sidewalls of the trenches 104, 106 to protect the insulating layer(s) 202 to 206 formed thereon during removal of the insulating layer material from the base of the trenches 104, 106. For example, hard masks (e.g., steel, mylar, etc.) or soft masks (e.g., photoresist materials) can be utilized to protect the top of the substrate 102 and sidewalls of the trenches 104, 106 during removal of the insulating layer material from the base of the trenches 104, 106.

Various techniques will now be described for forming energy storage device layers within the trenches 104, 106. The following embodiments illustrate one or more fabrication process for forming energy storage device layers and the effective integration of both electrochemically active and inactive energy storage layers utilizing an anode to cathode method or a cathode to anode method. It should be noted that any viable, chemically bonded independent electrochemically inactive or active energy storage device layer components may be employed such that overall device performance (e.g., capacity, kinetic movement of charge, lowest possible internal resistance, lowest possible interfacial impedance etc.) is altered in an advantageous manner.

Figure 3:
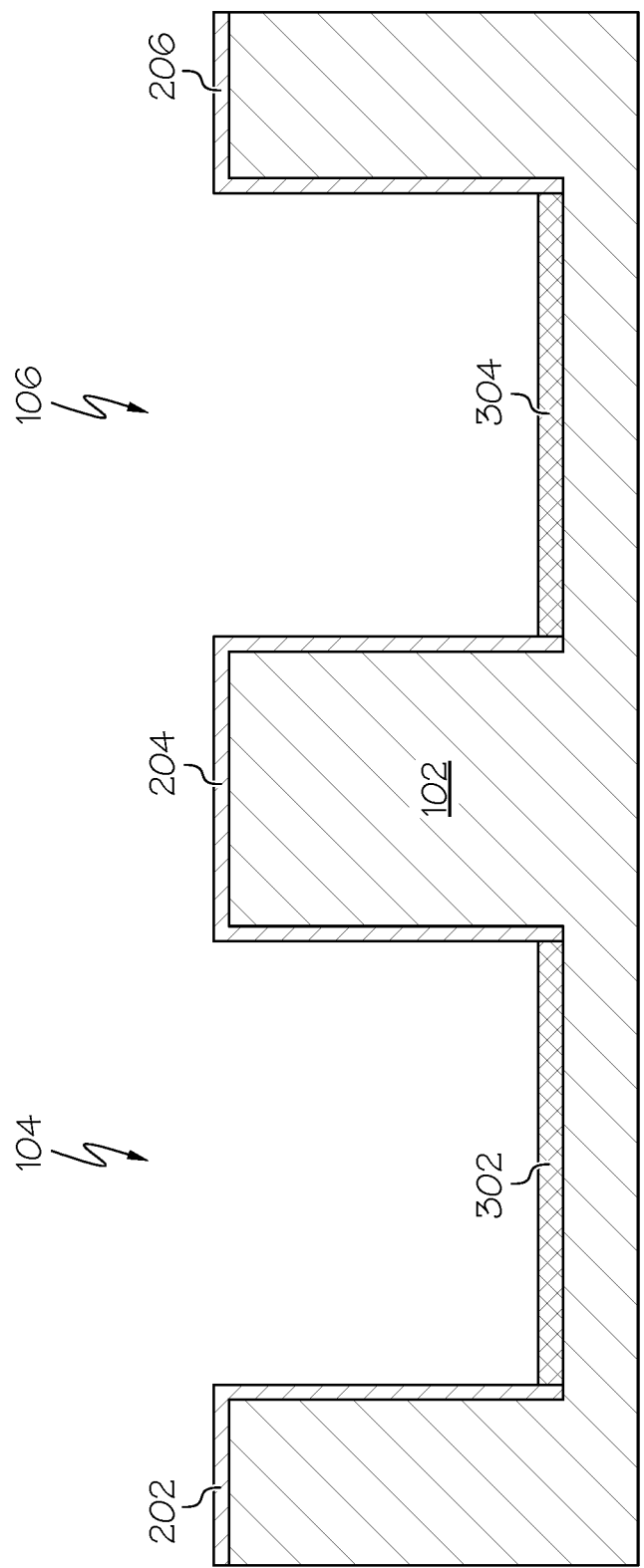
FIG. 3 is a cross-sectional view of the semiconductor structure after a charge hosting material has been formed according one embodiment of the present invention.

FIG. 3 shows an initial point in the fabrication process utilizing an anode to cathode method. In the example shown in FIG. 3 a layer of charge hosting material 302, 304 on the anode side such as porous silicon may be formed. Porous silicon has been shown to be utilized as a stable, reversible charge storage host for lithium. The layer of charge hosting material 302, 304 may be inherent to the framework/structure of the silicon-based energy device housing unit (e.g., porous silicon created at the base of an energy storage housing unit trench). Alternatively, the layer of charge hosting material 302, 304 may be a separate membrane-type structure place/integrated inside the energy storage device housing unit. In other embodiments, the layer of charge hosting material 302, 304 may be a metal, metal alloy, molten metal, solid powder, solid powder/anode material composite, or semi-solid powder/anode/additive slurry composite examples include lithium metal, lithium iodine material, molten lithium metal, graphite, carbon nanotubes (CNT), Lithium powder, lithium/carbon based powder, lithium/carbon/Si based powder composites, Lithium salt/carbon/Si/polymer (e.g., polyaniline) based composite material.

In one or more embodiments where the layer of charge hosting material 302, 304 is porous silicon this layer may be formed, for example, according to the methods discussed in the commonly owned U.S. patent application Ser. No. 16/032,317, filed on Jul. 11, 2018 and titled "In-silicon energy storage devices containing integrated porous silicon electrodes", which is hereby incorporated by reference in its entirety. For example, in some embodiments, the non-porous silicon substrate 102 is a p− type silicon material. The use of an electrical and ionic insulating layer or layers (e.g., layers 202 to 206) may act as both a protectant of the original non-porous silicon substrate material (e.g., during HF or RIE etching processes) and as an electrical and ionic insulator for advancing the performance of completed energy storage devices. The electrical and ionic insulating materials, as mentioned above, may also act as a dielectric spacer as they have both charge-particle insulating properties and function as a "spacing" material between deposited energy storage device components and the original silicon substrate material. Formation of layers 202 to 206 is advantageous for controlling where porous silicon is formed during the processing described below.

Epitaxial layers may be formed at the exposed bases of the trenches 104, 106 in the non-porous silicon substrate 102. In some embodiments, p+ type silicon (e.g., with a Boron doping in the range of $10^{18}/cm^3$ to greater than $10^{20}/cm^3$, with an exemplary doping of 1 to $3^{19}/cm^3$) is formed via selective epitaxial deposition at the exposed bases of the trenches 104, 106 in the non-porous, p− silicon substrate 102. In other embodiments, the epitaxial layers may be formed via a selective epitaxial growth process. Some embodiments may further combine selective epitaxial growth and ion implantation processes to form the epitaxial layers. The epitaxial layers may be p+ epitaxial layers, such as boron doped silicon. The epitaxial layers may have a vertical thickness (in direction Y-Y') which ranges as desired, such as from 0.1 μm to 20 μm, preferably in the range of 2 μm to 3 μm. More generally, the epitaxial layers may be formed with a thickness that is much thinner than the thickness of the trenches 104, 106 that they reside in. As described elsewhere herein, the size of the trenches 104, 106 may vary to accommodate a desired thickness for resulting porous silicon layers while leaving sufficient room for formation of components of the energy storage devices.

Porous silicon layers may be formed via anodic etching of the epitaxial layers, such as using an HF-based anodization etching treatment to form the layer of charge hosting material 302, 304. The anodization treatment may include etching in a solution of 49% HF for a specific period of time (e.g., 10 seconds (s) to 20 minutes (min), with a preferred time of less than 500 s) at a specific current density normalized to the surface area of the trench base (e.g., less than 1 to greater than 10 milliamperes per square centimeter ($mA/cm^2$)). The anodization treatment may further utilize surface cleaning treatments (e.g., RCA cleaning treatments such as: ammonium hydroxide ($NH_4OH$): hydrogen peroxide ($H_2O_2$): deionized (DI) water in a 1:1:5 ratio at nominally 80° ° C.

The porous silicon structure induced via electrochemical anodization in concentrated HF enables a volume-expansion compensating, lithium charge storage capability in/on Silicon rich material, mechanical electrode-failure suppressing, high capacity, and high limiting diffusion coefficient porous silicon electrode material. Advantageously, porous silicon electrodes formed utilizing the silicon-wafer/porous silicon unitary construction described herein do not require deposition of additional materials (e.g., structural-enhancing material, conductive agents, stabilizing agents) for the pore structure lifetime during electrochemical cycling. The methods herein describe the highly advantageous attribute of unity between the fabricated porous silicon and the crystalline silicon substrate or wafer from which it was created, while enabling the additional advantage of 3D patterning of porous silicon on the original crystalline silicon substrate from which the porous silicon emerges. In addition, porous silicon electrodes may be fabricated in a specified thickness or cross-section of the p+ doped silicon, enabling porous silicon to be physically, chemically, and mechanically unified with a non-porous silicon substrate (e.g., a pure silicon bulk substrate). In some embodiments, the porosity of the bulk porous silicon electrode layer maintains less than 30% total internal porosity.

Figure 4:
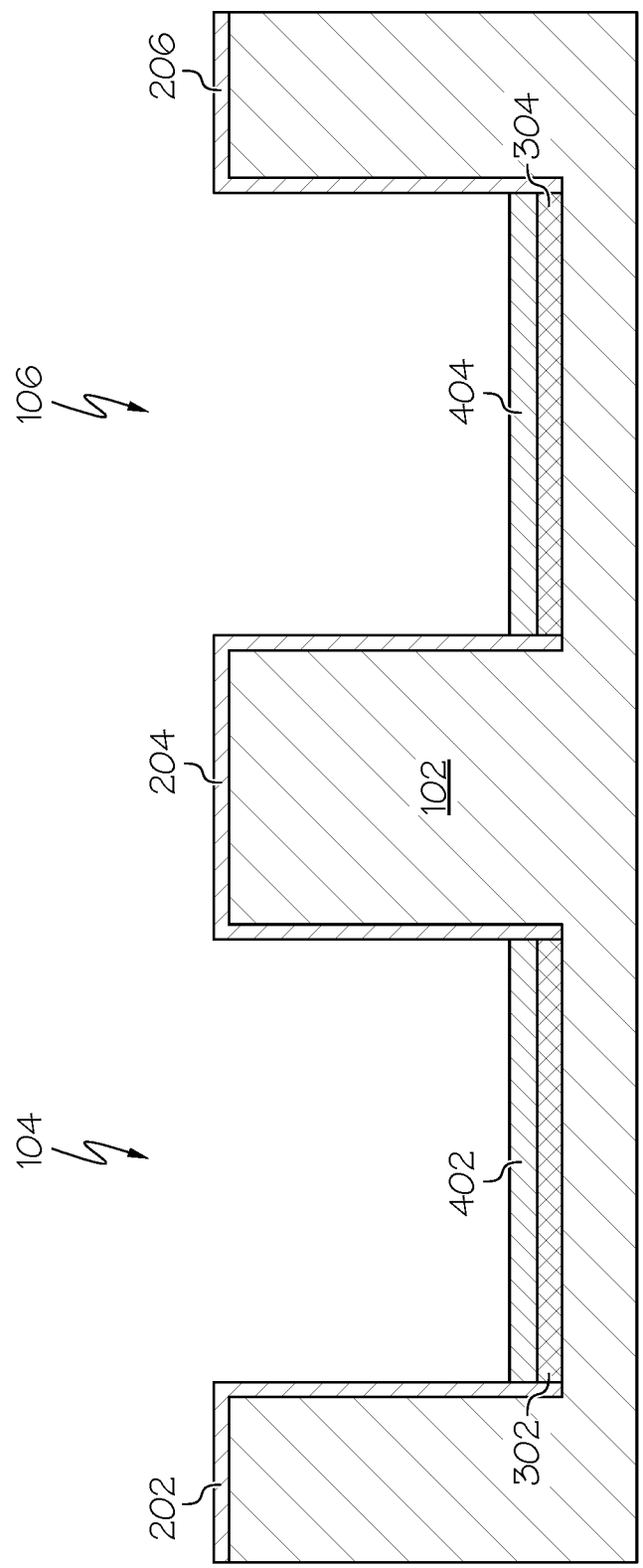
FIG. 4 is a cross-sectional view of the semiconductor structure after charge-containing anode metals/materials have been formed according one embodiment of the present invention.

FIG. 4 shows that after the layer of charge hosting material 302, 304 (either porous silicon or 1) charge hosting material or 2) metallized current collector) has been formed, charge-containing anode metals/materials 402, 404 may be integrated into the trenches 104, 106 if the charge hosting material is porous silicon or a metallized current collector. The composition of anode materials, for example, may take the form of but not limited to evaporated lithium metal, molten lithium metal, pressed molten lithium metal, electrochemically deposited lithium material, lithium powder, graphite, lithiated graphite, carbon based materials, lithiated carbon based materials, lithium powder/carbon composite, lithium powder/carbon/solid electrolyte composite and/or any other suitable charge-hosting anode material(s). The conditions at which the anode material(s) 402, 404 is applied into the energy storage device may vary based on the materials used and how those materials may be integrated into the trenches 104, 106 with the lowest electrochemically functioning internal resistance and device performing character. It should be noted that the charge containing anode/materials 402, 404 may also contain additives that can lower the internal and interfacial impedance between the charge containing materials, charge hosting materials, and electrolyte materials. Such additives can take the form of but are not limited to: lithium salt containing polymer formulations, Li-salt containing polyaniline, lithium fluoride, aluminum oxide, aluminum fluoride, LiPO, etc.

FIG. 4 also shows that if layers 302, 304 are charge containing materials (e.g., lithium metal, powder or slurry composites, etc.) then layers 402, 404 are interfacial additive material layer(s). Such additives can take the form of but are not limited to: lithium salt containing polymer formulations, Li-salt containing polyaniline, lithium fluoride, aluminum oxide, aluminum fluoride, LiPO, etc.

One non-limiting example of such an integration process may take the form but are not limited to: hot pressing anode material at elevated temperatures (e.g., 100 C, 150 C, 182 C, 220 C, >250 C etc.) for a specific period and then cooling the hot-pressed anode at a specified rate (e.g., 1 C/min, 10 C/min, etc.). Another non-limiting example includes casting molten charge-hosting metal or metal/additive composite such as molten lithium (Li) metal or molten lithium metal/carbon/additive composites onto/into the trenches 104, 106 and controlling the cooling rate and/or the pressure applied or temperature controlled pressure applied to molten or semi-molten charge-hosting metal electrode material as temperature control ensues.

Another non-limiting example includes utilizing the hot pressing methods to control the morphology, molecular structure, adhesion, and/or chemical cross-linking capability of interfacial additives such as Li-salt containing polymers. It should be noted that other integration processes are applicable as well. Under the embodiment that layer 302, 304 is a charge host material (e.g. porous silicon or metal material) the charge-containing anode metals/materials 402, 404 may be deposited using slurry casting, molten metal deposition, micro or nano pressurized pipetting, electrochemical deposition, evaporation, PVD, ALD, or any other established method suitable for deposition of anode material at the base of the trench, as dependent on the composition and form factor of the desired anode material(s).

In some embodiments, a wetting agent such as aluminum (Al) or Li-salt containing polymer(s) or lithium fluoride may first be applied prior to forming the charge-containing anode metals/materials 402, 404. Such wetting agents enhance the adhesion between the charge host and charge containing materials thereby lowering the interfacial impedance of the material as charge is transferred across the interface and consequently increasing cell performance. Such applications may be deposited via casting, micro or nano pressurized pipette methods, electrochemical deposition, evaporation, PVD, ALD or any other established method suitable for deposition of wetting agent material at the base of the trench, as dependent on the composition and form factor of the desired anode material(s).

The charge-containing anode metals/materials 402, 404 may have a vertical thickness (in direction Y-Y') ranging from less than 50 nm to greater than 50 μm depending on the choice of anode charge containing materials and processing methods employed. Interfacial additive material(s) may be integrated with or deposited on top of charge-containing anode material(s) 402, 404. Such integration may be conducted via casting, micro or nano pressurized pipette methods, electrochemically, sonication, vortexing, etc. Such deposition on top of 402, 404 may take place via evaporation, casting, micro or nano pressurized pipette methods, electrochemically, PVD, ALD, or any other established method suitable for deposition of wetting agent material at the base of the trench, as dependent on the composition and form factor of the desired anode material(s). Depositions of interfacial additives deposited on top of charge-containing anode material(s) 402, 404 may have a vertical thickness (in direction Y-Y') ranging from less than 5 nm to greater than 0.1 μm depending on the choice of interfacial additive material(s) and processing methods employed Under the embodiment that 302, 304 are charge containing materials, the same above processes m be employed for wetting agent and/or interfacial additive (in this case, layers 402, 404) integration/deposition. The interfacial additive material(s) 402, 404 may have a vertical thickness (in direction Y-Y') ranging from less than 5 nm to greater than 0.1 μm depending on the choice of interfacial additive material(s) and processing methods employed.

Figure 5:
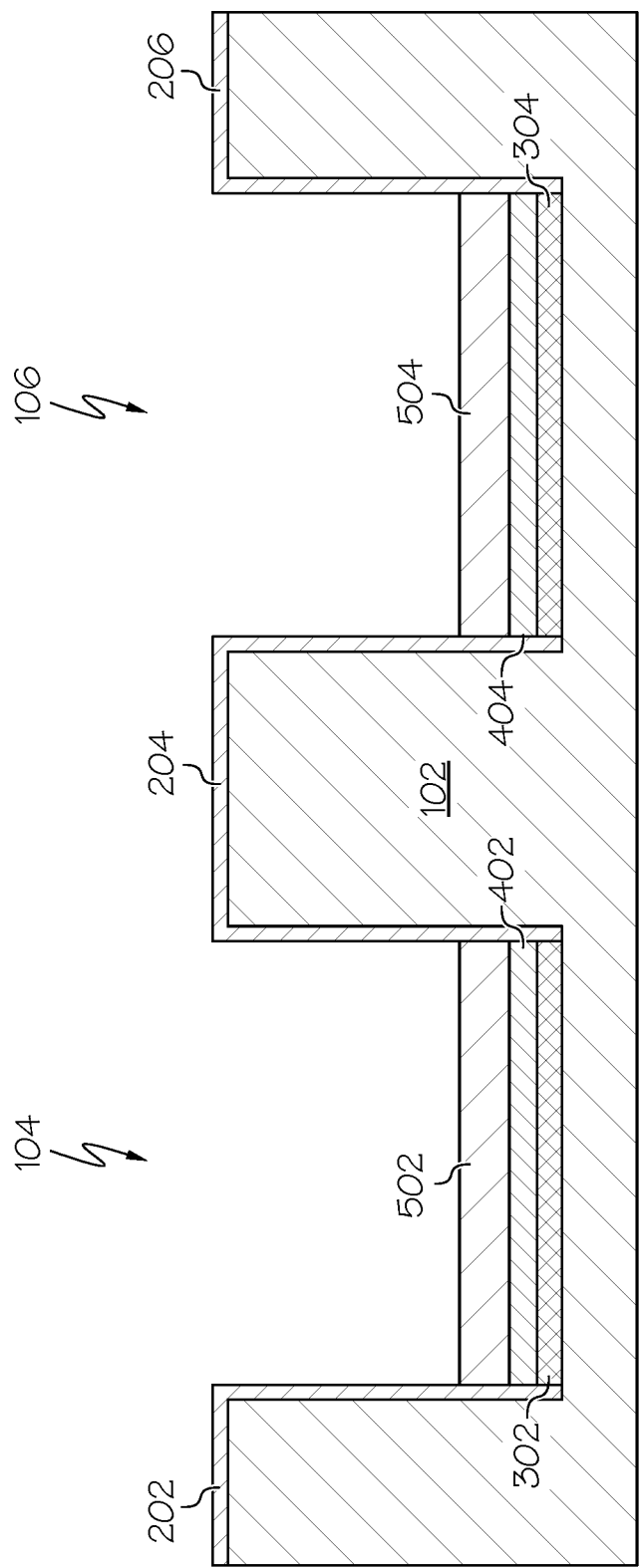
FIG. 5 is a cross-sectional view of the semiconductor structure after an electrolyte layer has been formed according one embodiment of the present invention.

FIG. 5 shows that an electrolyte layer 502, 504 is then formed on the anode metals/materials 402, 404. In some embodiments, the layer(s) 502, 504 formed following the anode metals/materials 402, 404 may be composed of a pure electrolyte material, an electrolyte/anode material composite; an electrolyte/anode material/charge hosting material composite with any necessary additives applied in the homogenous mixture or at the interface between layers; etc. The electrolyte layer 502, 504 may be formed of a liquid, solid or semi-solid material such that it is ionically conducting to lithium yet also maintains a very low conduction with respect to electrons, and which requires or does not require an additionally electrically separating material (a separator such as polyacrylonitrile (PAN)).

The electrolyte layer 502, 504 may be formed of, for example, a solid electrolyte such as lithium phosphorus oxynitride (LiPON), although other suitable materials such as lithium phosphorus sulfide ($Li_3PS_4$), lithium germanium phosphorus sulfide ($Li_{10}GeP_2S_{12}$), lithium tin sulfide ($Li_4SnS_4$), lithium phosphorus sulfide chloride ($Li_6PS_4Cl$), lithium titanate oxide ($Li_4Ti_5O_{12}$), lithium zirconium oxide ($Li_2ZrO_3$), lithium lanthanum zirconium oxide ($Li_7LaZr_2O_{12}$), lithium germanium oxide ($Li_4GeO_4$), lithium niobate ($LiNbO_3$), lithium germanium phosphate ($LiGe_2(PO_4)_3$), lithium titanium phosphate ($LiTi_2(PO_4)_3$), lithium oxide chloride ($Li_3OCl$), lithium magnesium bromide ($Li_2MgBr_4$), lithium aluminum bromide ($LiAlBr_4$), lithium zirconium bromide ($Li_2ZrBr_4$), lithium manganese bromide ($Li_2MnBr_4$), lithium chloride (LiCl), lithium magnesium chloride ($Li_2MgCl_4$), lithium zirconium chloride ($Li_2ZnCl_4$), lithium cadmium chloride ($Li_3CdCl$), lithium aluminum fluoride ($Li_3AlF_6$), lithium argon fluoride ($Li_2ArF_6$), lithium aluminum titanium phosphate (LiAlTi($PO_4)_3$) (LATP), lithium aluminum germanium phosphate (LiAlGe($PO_4)_3$) (LAGP), lithium lanthanum argon oxide ($Li_7La_3Ar_2O_{12}$) (LLZO), lithium super ionic conductor (thio-LISICON) electrolytes such as $Li_{2+2x}Zn_{1-x}GeO_4$, lithium germanium phosphorus sulfide ($Li_{3.25}Ge_{0.25}P_{0.75}S_4$), lithium phosphorus sulfur chloride ($Li_6PSCl$), lithium phosphorus sulfur bromide ($Li_6PSBr$), lithium phosphorus sulfur iodine ($Li_6PSI$), lithium sulfide-phosphorus sulfide ($Li_2S$—$P_2S_4$), lithium phosphorus sulfide ($Li_7P_3S_{11}$), lithium lanthanum argon niobium oxide ($Li_{6.75}La_3Ar_{1.75}Nb_{0.25}O_{12}$), gel polymers, ceramics, a Sol-Gel combination, lithium aluminum titanium phosphate ($Li_{1.3}Al_{0.3}Ti_{1.7}(PO_4)_3$) or more generally any LiAlTi($PO_4$), any combination of varying $Li_2S$ to $P_2S_4$ percent combinations, LiTFSI containing polycaprolactone, succinonitrile solid polymer electrolyte, any other Li-conductive/Li-salt containing polymer electrolyte, ceramic containing and/or plasticizer containing solid electrolytes, or any other feasible electrolyte which performs the function of electrolyte active layers in a stable or semi-stable (e.g., low interfacial resistance) fashion when utilized in energy storage devices may be used.

The electrolyte layer 502, 504 may be deposited using PVD, ALD, chemical vapor deposition (CVD), hot pressing (e.g., thermally controlled mechanical pressurization), hot pressing under vacuum conditions (e.g., thermally controlled pressurization in controlled vacuum conditions), slurry-based casting, polymer based casting, micro or nano pressurized pipetting, sol-gel type or in-situ formation of the electrolyte layer through electrochemical deposition processing, etc. The electrolyte layer 502, 504 may have a vertical thickness (in direction Y-Y') ranging from less than 20 nm to greater than 20 μm depending on choice of composition, deposition and processing processes.

In one or more embodiments, the interfaces between electrochemically active layers such as the electrolyte layers 502, 504 following the anode charge hosting layer 302, 304 or anode charge hosting layer/anode material layer 402, 404 are chemically integrated in an effective manner such that the interfacial impedance attributed to the anode/electrolyte interface is minimized. Such an embodiment may achieve a low interfacial impedance in various ways. For example, in one embodiment, a solid electrolyte or electrolyte/additive composite may be applied to a molten lithium anode metal as the metal is cooling/hardening such that the electrolyte or electrolyte/additive composite is well integrated into the molten lithium metal when it cools. For example, if the electrolyte composite is Li-salt containing polyaniline, cross linking temperature ranges for this material can occur during the cooling of molten Lithium metal as it condenses into hardened Lithium metal. In another embodiment, solid electrolyte or electrolyte/additive composite material, is employed as previously described, but also with applied isostatic or temperature controlled isostatic pressure in combination with thermal control of the material (e.g., hot pressing) may be tuned such that glass transition temperatures and/or cross-linking temperature thresholds are achieved, thereby increasing chemical adhesion between the anode and electrolyte or composite material.

In a further embodiment, solid electrolyte or electrolyte composite may be applied as previously described but with a solid electrolyte component that is semi-solid and hardens upon cooling. In another embodiment, a solid electrolyte or electrolyte may be applied as previously described but with a solid electrolyte component that is semi-solid and hardens upon cooling and then is thermally treated to induce chemical cross-linking between the anode interface and the next subsequent interface above it. In yet a further embodiment, solid electrolyte or electrolyte composite may be applied as previously described where the respective pressure and temperature of the integrated solid electrolyte is controlled such that the material reaches its glass transition temperature (e.g., Li3OCl>130 C or 80Li2S 20P2S5>240 C) and creates a chemical cross-linking effect at both interfaces either between two electrolyte layers, an electrolyte/additive composite layer, electrolyte/additive/cathode or electrolyte/additive/anode layers. In yet another embodiment, solid electrolyte or electrolyte composite may be applied as previously described but onto hardened anode or charge hosting material (e.g., lithium foil or porous silicon) with either a solid electrolyte component that is semi-solid and hardens upon cooling, or a glassy/ceramic solid electrolyte and allow for the above described cross-linking events to occur via thermal and/or mechanical pressure treatments.

In some embodiments, after the anode metals/materials 402, 404 have been formed, an interfacial additive layer (not shown) may be deposited on and in contact with the anode metals/materials 402, 404. This interfacial additive layer (also referred to herein as "anode-electrolyte interfacial layer") may be formed at the anode (e.g., first active electrode layer 402, 404)-electrolyte (e.g., electrolyte layer 502, 504). The anode-electrolyte interfacial layer may be formed of aluminum oxide ($Al_2O_3$), aluminum fluoride, lithium fluoride, Li-salt containing polymers (e.g., Li-salt containing polyaniline), etc. The anode-electrolyte interfacial layer may be deposited using evaporation type, PVD and/or in-situ electrochemical deposition or plating-type processing. The anode-electrolyte interfacial layer may have a vertical thickness (in direction Y-Y') ranging from less than 10 nm to greater than 1 µm depending on composition desired and deposition method.

Figure 6:
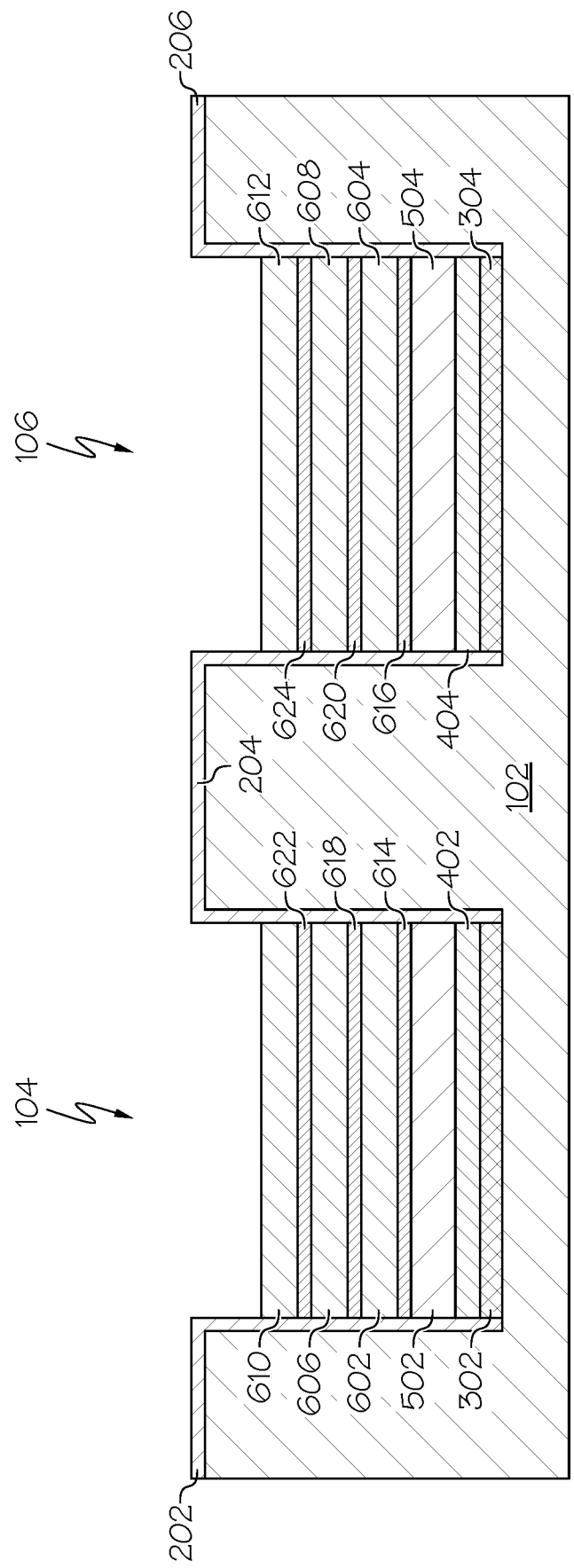
FIG. 6 is a cross-sectional view of the semiconductor structure after a plurality of cathode layers has been formed within the vias according one embodiment of the present invention.

FIG. 6 shows that after the electrolyte layers 502, 504 have been formed, one or more cathode layers 602 to 612 are formed within the trenches 104, 106. The cathode layers 602 to 612 may each have a vertical thickness (in direction Y-Y') ranging from less than 300 nm to greater than 100 µm. In one embodiment, a bottom-most cathode layer 602 is formed on and in contact with the electrolyte layer 108. In other embodiments, an interfacial additive layer 614, 616 is first formed on and in contact with the electrolyte layer 502, 504 and the bottom-most cathode layer 602, 604 is formed on and in contact with the bottom-most cathode layer 602. The material(s) of the interfacial additives 614, 616 may be applied in a homogenous mixture of the electrolyte layers 502, 504 or as a separate layer at the interface between the electrolyte layer 502, 504 and the bottom-most cathode layer 602, 604. In some embodiments, each of the one or more cathode layers 602 to 612 is separated by an interfacial additive layer 618 to 624. The material(s) of the interfacial additives 618 to 624 may be applied in a homogenous mixture of the respective cathode layers 602 to 612 or as a separate layer at the interface between the cathode layers 602 to 612. Examples of interfacial layer additive materials may be (but not limited to): Aluminum fluoride, lithium fluoride, Li-salt containing polymers (e.g., Li-salt containing polyaniline), polyaniline, aluminum oxide, etc. Where the thicknesses can range from <10 nm to >50 nm depending on the composition of additive and post deposition treatment.

Each of the one or more cathode layers 602 to 612 (also referred to herein as "cathode-based active electrode layers 602 to 612") may be formed of lithium cobalt oxide ($LiCoO_2$) (LCO) or another suitable material such as lithium manganese oxide ($LiMn_2O_4$) (LMO), Lithium Manganese Oxyflouride ($Li_2MnO_2F$), lithium nickel manganese cobalt oxide ($LiNiMnCoO_2$) (NMC), lithium manganese nickel oxide ($LiMn_{1.5}Ni_{0.5}O_4$), lithium iron phosphate ($LiFePO_4$), lithium iron manganese phosphate ($LiFeMnPO_4$), lithium nickel cobalt aluminum oxide ($LiNiCoAlO_2$) (NCA), lithium nickel manganese cobalt oxide (NMC), lithium iron phosphate-lithium cobalt oxide ($LiFePO_4$—$LiCoO_2$), lithium iron phosphate-lithium manganese oxide ($LiFePO_4$—$LiMn_2O_4$), lithium vanadium phosphate-lithium manganese phosphate ($Li_3V_2(PO_4)_3$—$LiMnPO_4$), or conversion/alloying type cathodic materials such as lithium sulfur based cathode materials or any suitable cathode materials which can maintain relatively high capacity as well as power density capabilities as set by the industrial standards for the time.

Each of the one or more cathode layers 602 to 612 may be deposited using PVD, CVD, hot pressing (e.g., thermally controlled mechanical pressurization), hot pressing with under vacuum conditions (e.g., thermally controlled pressurization in controlled vacuum conditions), slurry-based casting, polymer cathode composite based cathode composite casting, electrodeposition, micro or nano pressurized pipetting, sol-gel cathode containing material type deposition or in-situ formation of interfacial/cathode layer through electrochemical deposition and or vacuum based deposition processing. In some embodiments, the cathode layers 602 to 612 may be formed utilizing a deposition process such as, sputtering, slurry casting, or electrodeposition.

In one embodiment, the cathode layers may be formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof in conjunction with oxygen.

In other embodiments, the cathode layers 602 to 612 may be formed by slurry casting, which may contain a mixture of electrochemically active [cathode materials, electron-conducting materials (e.g., carbon-based materials)] and inactive (binder materials) components. These slurries may also have an electrolyte component in the mixture, along with a lithium-based salt(s) and potentially Lithium conductive based plasticizer components (e.g., Succinonitrile). Such depositions of slurry (wet) or PVD (dry) based cathode materials can take place in an iterative process, where multiple layers are deposited with independent layer processing (freshly deposited layer) is processed (thermally/pressure-based) prior to depositing subsequent layers in order to enhance the performance properties of the final energy storage device (e.g. lower internal resistance, interfacial impedance, higher capacity, desired molecular structure, etc.).

In one or more embodiments, the interfaces between electrochemically active layers such as the cathode layers 602 to 612 following the electrolyte/anode layer or electrolyte composite/anode composite layer are chemically integrated in an effective manner such that the internal resistance attributed to the electrolyte/cathode interface is minimized. As such, the same processing and integration methodology above with respect the electrolyte layers 502, 504 may be applied to better integrate the cathode and electrolyte interfaces. For example, the processing and integration methods such as hot pressing, cold pressing, thermal treatments, maintaining intimate contact between interlayers, and temperature-controlled softening and/or hardening between semi-solid electrolyte and cathode layers may be performed. Glass transition or thermal or chemical induced chemical cross linking may ensue due to such methods, enhancing the performance properties of the final energy storage device (e.g. lower internal resistance, interfacial impedance, higher capacity, desired molecular structure, etc.).

In one or more embodiments, the cathode material 602 to 612 is electrochemically accessible to the electrolyte layer 502, 504 material(s) to maximize the reversible charge storage capability (capacity) of the cathode material, while also contributing towards the kinetic versatility of charge movement throughout the energy storage device (power capabilities). In at least some embodiments, most (if not all) of the cathode material may be electrically as well as ionically conductive in a nearly homogenous fashion throughout the thickness of the cathode material to also contribute to increased kinetic performance of the cathode material. These features may be obtained in various ways. For example, composites of electrolyte/cathode/carbon/interfacial additives may be formed for the active electrode layers 602 to 612 acting as the cathode layer(s). Each independent composite layer may be the same in the concentration ratio of the composite components or vary in their concentration ratios. This allows the working and rechargeable properties of the energy storage device to be significantly increased. Such properties that are tuned with the cathode/electrolyte/additive composites enable higher energy capacity, power density, more versatile ion transport kinetics, lower internal resistance and lower interfacial impedance of the completed energy storage device.

FIG. 6 shows three cathode layers 602 to 612 within each trench 104, 106 as an example. However, other embodiments may utilize additional or fewer (two) cathode layers. At least some of these embodiments the cathode layer may have specific ratio concentrations, utilizing the variation in cathode to subsequent cathode layer(s), and may take the form of (but not limited to) a formulation used in the anode to cathode method. Each cathode layer within an energy storage device may have different ratios of material concentrations.

For example, a first cathode layer may comprise 90% electrolyte material(s), 8% cathode material(s), and 2% electric conductivity additive(s) (carbon material(s). A second cathode layer may comprise 80% electrolyte material(s), 16% cathode material(s), and 4% electric conductivity additive(s) (carbon material(s)). A third cathode layer may comprise 64% electrolyte material(s), 30% cathode material(s), and 6% electric conductivity additive(s) (carbon material(s)). A fourth cathode layer may comprise 45% electrolyte material(s), 47% cathode material(s), and 8% electric conductivity additive(s) (carbon material(s)). A fifth cathode layer may comprise 20% electrolyte material(s), 70% cathode material(s), and 10% electric conductivity additive(s) (carbon material(s)). A sixth cathode layer may comprise 10% electrolyte material(s), 80% cathode material(s), and 10% electric conductivity additive(s) (carbon material(s)). A seventh cathode layer may comprise 0% electrolyte material(s), 90% cathode material(s), and 10% electric conductivity additive(s) (carbon material(s)).

Such composition variations in each subsequent cathode material layer, in combination with the interfacial additive methods discussed herein and the thermal, mechanical, physical and chemical independent or grouped layer processing methods discussed herein, enable high energy capacity, physically dense, power dense, low-resistive, low interfacial impedance and ionically-labile functioning cathodes where the cathode thickness are tunable to very thin (e.g. <50 nm) or to very thick measures (e.g. >250 □m) and therefore resulting power density or energy capacity capabilities of the resulting all solid state or semi-solid state energy storage devices energy storage device are greatly enhanced, respectively.

Figure 7:
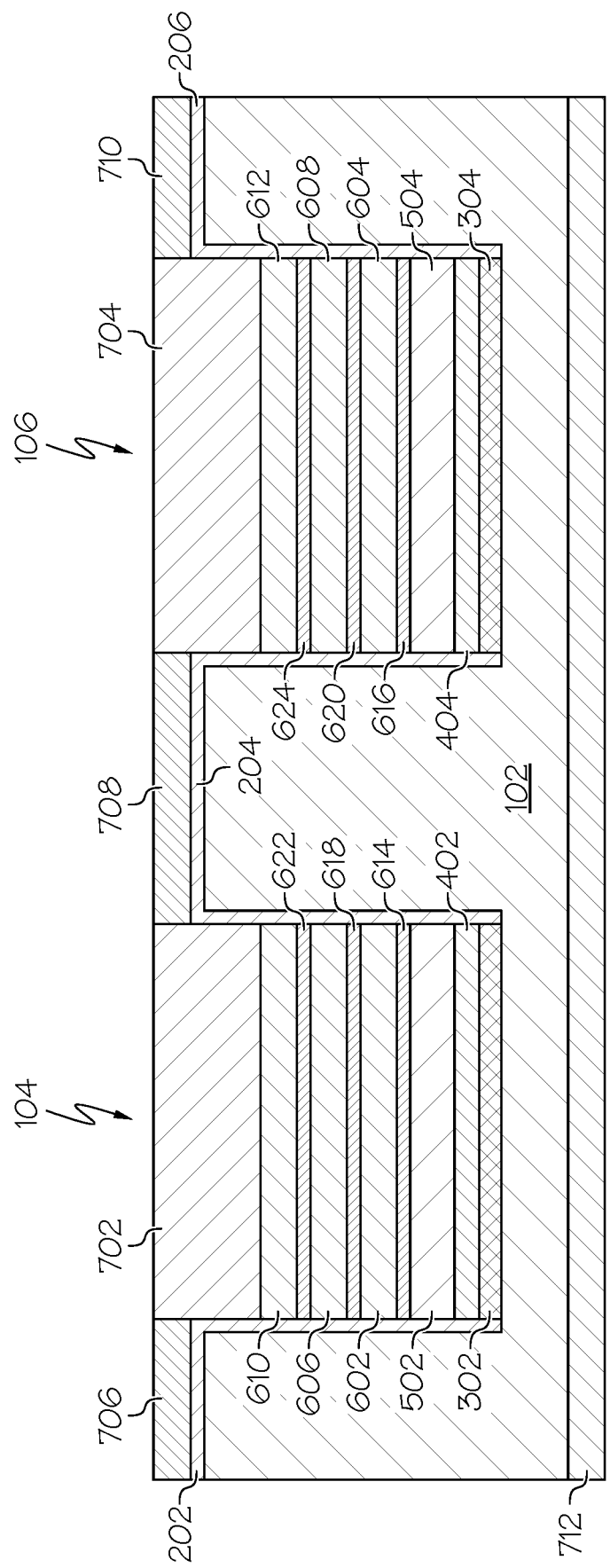
FIG. 7 is a cross-sectional view of the semiconductor structure after a top current collector, encapsulation layer, and backside current collector have been formed according to one embodiment of the present invention.

After the cathode layer(s) 602 to 612 have been formed, a top-side current collector 702, 704 may be formed on the cathode layer(s) 602 to 612 as shown in FIG. 7. In some embodiments, the top surface of the top-side current collector 702, 704 extends above the top surface of the trench 104, 106 including the insulating layer 202 to 206. In other embodiments, the top surface of the top-side current collector 702, 704 is planar with the top surface of the trenches 104, 106 including the insulating layer 202 to 206. It should be noted that, in some embodiments, an interfacial layer (not shown) similar to those discussed above may be formed on the top-most cathode layer 610, 612 prior to forming the top-side current collector 702, 704. The top-side current collector 702, 704 may then be formed in contact with this interfacial layer.

The top-side current collector 702, 704 may be formed of copper (Cu), nickel (Ni), aluminum (Al), titanium (Ti), tungsten (W), platinum (Pt), gold (Au), a suitable composite material such as nickel-copper composite materials, or another suitable, electrochemically stable current collecting material. The top-side current collector 702, 704 may be deposited/formed using electroplating, PVD, ALD, evaporation, mechanical attachment, thermo-mechanical processing, etc. The top-side current collector 702, 704 may have a horizontal width (in direction X-X') which matches that of the underlying active electrode layer 602 to 612 (as shown), or has a smaller or larger surface area than that of the underlying electrode and a vertical thickness (in direction Y-Y') which does not impede its mechanical robustness, adhesion properties or conductive properties under electrochemical conditions, such as ranging from less than 500 nm to greater than 50 μm, depending on the nature of the current collector and the desired performance properties.

In some embodiments, the top-side current collector 702, 704 may also be applied, with/without a single or multiple treated cathode layers pre-attached to a current collector and fabricated under spalling conditions. The utilization of spalling methods in combination with the herein described processing of electrochemically active and inactive energy storage device components enables significant advances in the manufacturing efficiency of all solid state or semi-solid-state micro and macro scaled energy storage devices. Such a method provides the benefit of having a well-adhered cathode/current collector interface prior to taking advantage of the chemical bonding/high interfacial overlap-inducing methodology discussed above between the top-most cathode layer of the spalled material and the top cathode layer of the bottom-up-constructed energy storage device contained inside the energy storage device housing unit. Such a method where spalling is combined with independently applied layers may be applicable in both micro (<10 uAh energy storage cells) to macro (>10 uAh energy storage cells) scales.

FIG. 7 further shows an encapsulation layer 706 to 710 being formed on the top surface of the insulating layer 202 to 206 that is in contact with the top surfaces of the trenches 104, 106. The encapsulation layer 706 to 710 may be formed after the top-side current collector 702, 704 has been formed. In some embodiments, the top surface of the encapsulation layer 706 to 710 is planar with the top surface of the top-side current collector 702, 704. The encapsulation layer 706 to 710 may surround the top-side current collector 702, 704. Suitable materials that may be used for encapsulation layer 706 to 710 include silicon nitride, polymer materials, metal-based materials, composite materials (such as $SiO_2$ layer followed by $Si_3N_4$, or $Si_3N_4$ layer followed by a layer of aluminum-based material followed by polymer-based material (e.g., parylene) where several iterations of this 3-fold layering can occur, etc.). The vertical thickness (in direction Y-Y') of the encapsulation layer 706 to 710 may be in the range of less than 500 nm to greater than 20 μm, although other thicknesses apply as well.

FIG. 7 also shows a bottom-side current collector 712 may be formed in contact with a bottom surface of the substrate 102. The bottom-side current collector 712 may comprise Al, or another suitable material such as Ni, Ti, W, Cu, Pt, au, or a suitable composite material. The bottom-side current collector 712 may be deposited/formed using PVD, ALD, evaporation, mechanical, thermo-mechanical processing, etc. The bottom-side current collector 712 may have a horizontal width (in direction X-X') which matches that of the width of the trenches 104, 106, or has a smaller or larger surface area than that of the active energy storage device materials residing above it and a vertical thickness (in direction Y-Y') which does not impede its mechanical robustness, adhesion properties or conductive properties under electrochemical conditions, such ranging from less than 100 nm to greater than 5 μm, depending on the nature of the current collector and the desired performance properties. It should be appreciated that in some embodiments, formation of the bottom-side current collector 712 may take place earlier than the processing and fabrication steps discussed above with respect to one or more of FIGS. 1-7.

Figure 8:
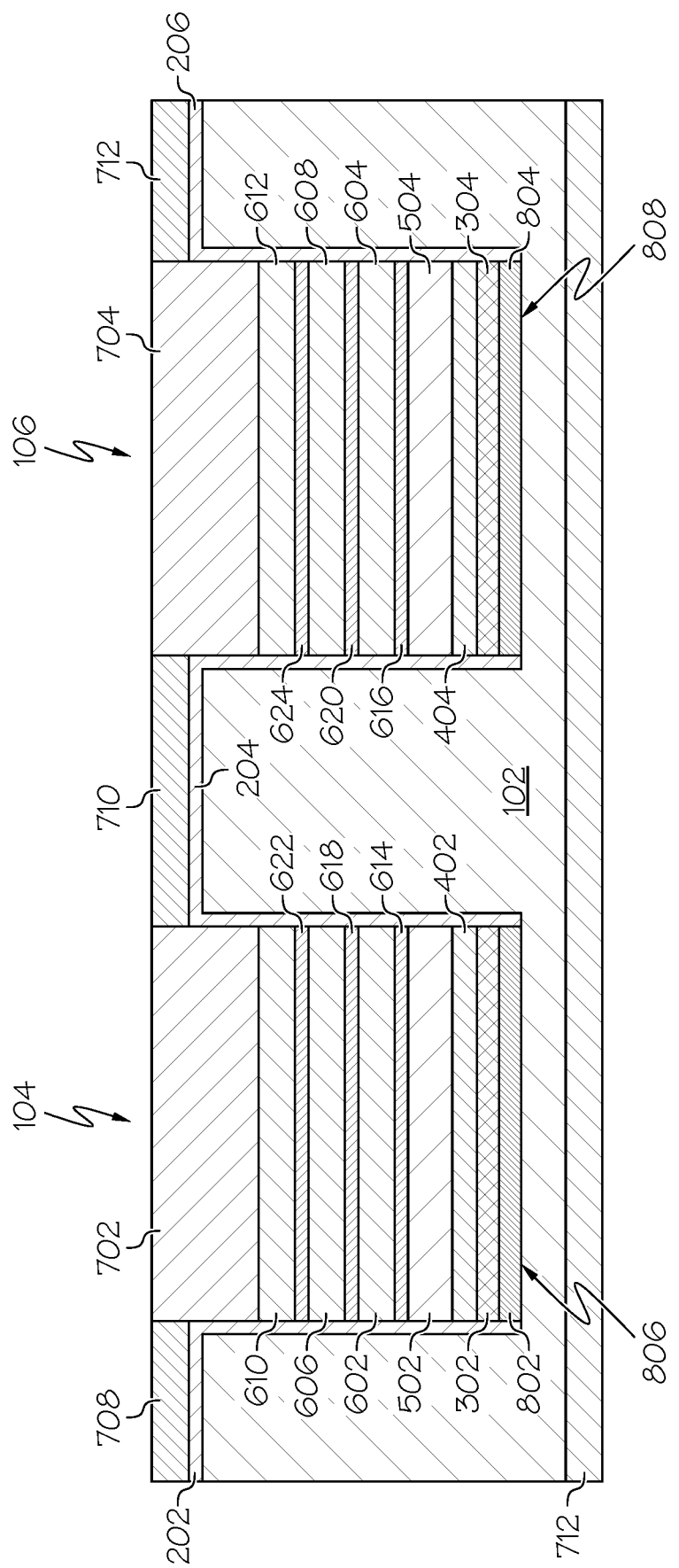
FIG. 8 is a cross-sectional view of another semiconductor structure comprising an energy storage device containment feature having a trench base current collector within the trenches according one embodiment of the present invention.

FIG. 8 shows another embodiment where trench base (bottom) current collectors 802, 804 are first formed within the trenches 104, 106 in contact with the bases 806, 808 of the trenches 104, 106. The trench base current collectors 802, 804 may be formed of copper (Cu) or another suitable material such as nickel (Ni), aluminum (Al), titanium (Ti), tungsten (W), platinum (Pt), gold (Au), a suitable composite material such as nickel-copper composite materials, etc. The trench base current collector 802, 804 may include a layer of a metallic anode-side electrode material, or a material stack of at least two different metallic anode-side electrode materials. In one example, the trench base current collector 802, 804 includes a stack of, from bottom to top, nickel (Ni) and copper (Cu). The trench base current collector 802, 804 may have a thickness from 10 nm to 50 nm. Other thicknesses that are lesser than, or greater than, the aforementioned thickness values may also be used for the trench base current collector 802, 804. The trench base current collector 802, 804 may be formed utilizing a deposition process including, for example, electroplating, electroless plating, PVD, ALD, chemical vapor deposition (CVD), plasma enhanced chemical vapor deposition (PECVD), evaporation, sputtering, plating, mechanical or thermo-mechanical processing, mechanically attached metallic foil, and/or the like. For improved contact resistance, alloying of the metallic anode-side electrode material with a semiconductor material base may be performed. Alloying may be achieved by performing a silicidation process as is known to those in the semiconductor industry. The remaining energy storage device may then be formed as discussed above with respect to FIGS. 1-7.

Figure 9:
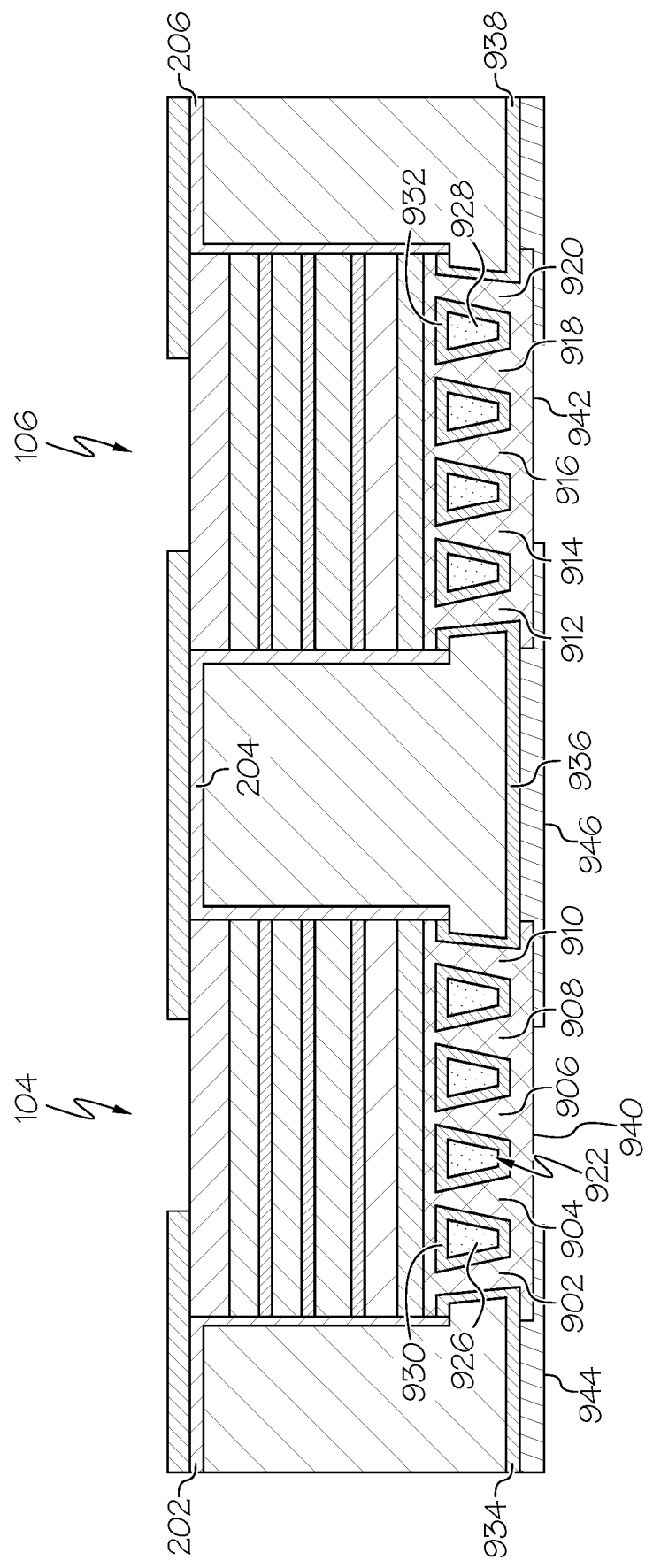
FIG. 9 is a cross-sectional view of another semiconductor structure comprising an energy storage device containment feature having a plurality of metal-filled through silicon vias according one embodiment of the present invention.

FIG. 9 shows yet another embodiment, where one or more through silicon vias (TSVs) 902 to 920 are formed through the base of the trenches 104, 106. The vias 902 to 920 may be formed by a D-RIE process through the top surface of the base of the trench 104, 106 and further through the underlying bottom surface 922, 924 of the substrate 102. In another embodiment, while the substrate 102 is flipped over such that its backside is facing upwards the D-RIE process may be performed such that the plurality of vias 902 to 920 are formed through the backside/bottom surface 922, 924 of the substrate 102 to and through the top surface of the trench base. The via formation process etches the base of the trench 104, 106 into a plurality of inter-via islands 926, 928 separated by the plurality of vias 902 to 922. In another embodiment, the vias 902 to 920 may be formed prior to forming the trenches 104, 106 by flipping the substrate 102 over and etching the vias through the backside/bottom surface of the substrate 102 and down into substrate 102.

The insulating layer 202 to 206 in this embodiment is formed similar that discussed above with respect to FIG. 2. However, the insulating layer 202 to 206 is formed such that is surrounds/contacts only the substrate field (top of substrate) and 3D trench sidewalls. Prior to creating the plurality of pillars/islands 926, 928, the insulating layer(s) may be removed from the base of the trench via etching (e.g., RIE, HF) process. An adhesion layer 930 to 938 may then be formed surrounding and in contact with the plurality of pillars/islands 926, 928. The adhesion layer 930 to 938 may be conformally deposited on the plurality of pillars/islands 926, 928 utilizing ALD, CVD, PVD, and/or the like. The adhesion layer 930 to 938 may comprise titanium nitride (TiN), tantalum nitride (TaN), and/or the like and may have a uniform thickness, such as in the range of <25 nm nanometers (nm) to >45 nm.

A trench base current collector 940, 942 and a backside current collector 944, 946 may then be formed. For example, a metal seed layer may be formed within the trenches 104, 106 and into the TSVs 902 to 920 via one or more deposition methods such as PVD and topside and/or backside deposition angles. A shadow mask be used for the deposition of the metal seed layer (See FIG. 11). The metal seed layer may comprise copper (Cu) or another suitable material such as nickel (Ni), aluminum (Al), titanium (Ti), tungsten (W), platinum (Pt), gold (Au), a suitable composite material such as nickel-copper composite materials, and/or the like which is chemically and electrically compatible with the material to fill the TSV features. Dry deposition of metal into the TSVs 902 to 920 and/or metal electroplating (e.g., electrochemical deposition) utilizing the seed layer may then be performed. This deposition process(es) fills the TSVs 902 to 920 with the metal material.

The material at the base of trench and backside of substrate may then be metal planarized to create platens, which form a trench base current collector layers 940, 942 and backside current collector layers 944, 946. The backside current collector layers 944, 946 extend below the backside (opposite the trench) surface of the substrate 102. The vias 902 to 920 connect both platen/collector layers. Alternatively, the backside metal material may by planarized at a later point in time such as after one or more additional energy storage device layers have been formed. In an embodiment where the TSVs 902 to 920 are formed prior to the trenches, the adhesion layer(s), metal seed layer, and backside current collector may be formed prior to forming the trenches 104, 106.

After the trench base current collectors 940, 942 and backside current collectors 944, 946 have been formed anode materials 402, 404 similar to those discussed above with respect to FIG. 4 may be formed over/on the trench base current collectors 940, 942. The remaining energy storage device may then be formed as discussed above with respect to FIGS. 1-7. However, the backside current collector (or similar layer) 702, 704 of FIG. 7 may or may not be formed since the backside contact layer 940, 942 has already been formed. It should be noted that a more detailed discussion regarding the TSV structure of FIG. 9 and fabrication thereof may be found in the commonly owned U.S. patent application Ser. No. 16/238,389, filed on Jan. 2, 2019 and titled "Through Silicon Via Energy Storage Devices", which is hereby incorporated by reference in its entirety.

Figure 10:
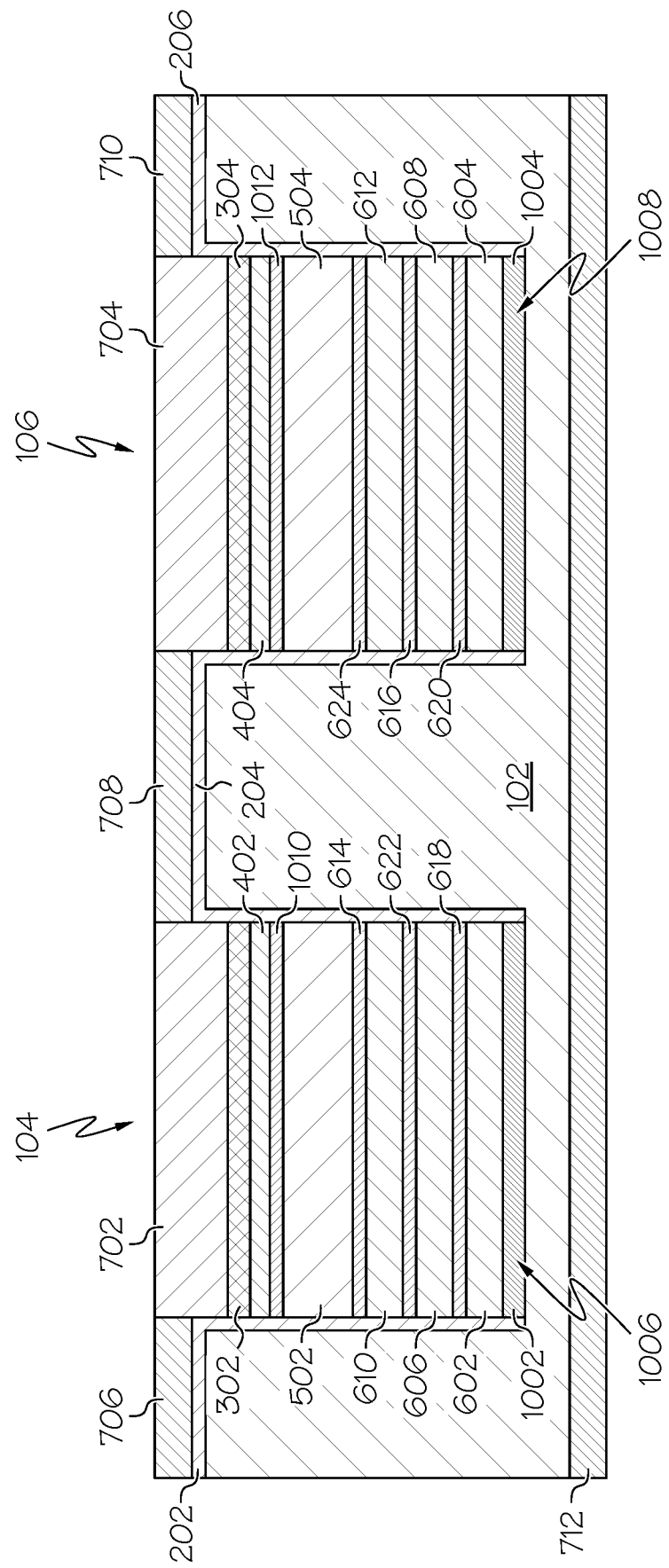
FIG. 10 is a cross-sectional view of the semiconductor structure having been formed utilizing a cathode to anode fabrication process according one embodiment of the present invention.

FIG. 10 shows a further embodiment where energy storage devices have been formed utilizing a cathode to anode method. In this embodiment the methods/processes discussed above with respect to FIGS. 1-8 are utilized to form the energy storage device layers, but the order of the layers is reversed. For example, trench base (bottom) current collectors 1002, 1004 are first formed within the trenches 104, 106 in contact with the bases 1006, 1008 of the trenches 104, 106 similar to that discussed above with respect to FIG.

8. Then, one or more cathode layers 602 to 612 and one or more optional interfacial additives 614 to 624 are formed over/on the trench base current collectors 1002, 1004 using processes similar to those discussed above with respect to FIG. 6.

One or more electrolyte layers 502, 504 are then formed on the cathode and interfacial layers 614 to 624. In one embodiment, interfacial layers 614, 616 are disposed between the top-most cathode layer 610, 612 and the electrolyte layers 502, 504. The electrolyte layers 502, 504 are formed utilizing processes similar to those discussed above with respect to FIG. 5. Interfacial layers 1010, 1012 may then be formed on the top surface of the electrolyte layers 502, 504 using a process(es) similar to those discussed above with respect to the other interfacial layers 614 to 624. Charge hosting material 302, 304 and/or charge-containing anode metals/materials 402, 404 (anode layer) may then be formed on the electrolyte layers 502, 504 (or top-most interfacial layers 1010, 1012 if formed). If a combination of charge hosting material 302, 304 and anode metals/materials 402, 404 are utilized, the anode metals/materials 402, 404 are first formed/deposited and then the charge hosting material 302, 304 are formed/deposited on the anode metals/materials 402, 404. The charge hosting material 302, 304 and anode metals/materials 402, 404 may be formed/deposited using processes similar to those discussed above with respect to FIGS. 3 and 4. The top-side current collectors 702, 704; encapsulation layers 706 to 710; and bottom-side current collector 712 may then be formed using processes similar to those discussed above with respect to FIG. 7.

Figure 11:
FIG. 11 illustrates various mask features that may be utilized to form various layers of an energy storage device according one embodiment of the present invention.
Figure 11:
Figure 11:
Figure 11:
Figure 11:
Figure 11:
Figure 11:
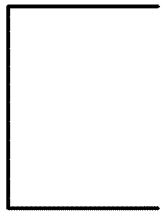
Figure 11:
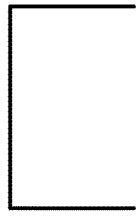
Figure 11:
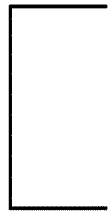
Figure 11:
Figure 11:
Figure 11:
Figure 11:
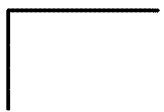
Figure 11:
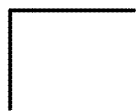
Figure 11:
Figure 11:
Figure 11:
Figure 11:

In some embodiments, the various energy storage device layers discussed above with respect to FIGS. 1-10 may be formed using "lock-and-key" style independent masks, also referred to as shadow masks, that are designed to fit in the trenches 104, 106. FIG. 11 shows various examples of shadow masks for the anode to cathode method of FIGS. 1-8 where the charge hosting material layer 302, 304 is not formed. The shadow masks may be "hard" masks (e.g., formed of a metal such as steel, stainless steel, polymer coated stainless steel, silicon, etc.) that may be physically deposited and lifted from the structure, or "soft" masks (e.g., formed of a resist material such as photopolymeric, photodecomposing, photocrosslinking photoresist, hydrocarbon/organic composition based resist materials, etc.) that may be deposited and removed chemically. The depth that each shadow mask reaches into the energy storage device containment features (e.g., trenches 104, 106) is based on how much "fill" of each component of the energy storage device is desired to be deposited into the energy storage device containment features. As each layer fills the trenches 104, 106, the depth of the shadow masks decreases. The shadow masks protect and prevent undesired or uncontrolled formation of the various energy storage device components on sidewalls of the trenches 104, 106 during wet (e.g., slurry, etc.), dry (e.g., atomic layer deposition (ALD) or sputtering, etc.) and hybrid methods of deposition of such components.

As shown, FIG. 11 includes a trench base current collector mask 1102 used for deposition of a seed or adhesion layer (FIG. 9) and/or formation of a current collector (e.g., layers 802, 804, layers 940, 942, and/or layers 944, 946); an anode mask 1104 used for formation of the anode or active electrode layer (e.g., anode layers 402 of FIG. 4), an interfacial additive mask 1106 used for formation of an interfacial additive layer (e.g., interfacial additive layers 614, 616 of FIG. 6); an electrolyte mask 1108 used for formation of the electrolyte layer (e.g., electrolyte layers 502, 504 of FIG. 5); a cathode mask 1110 used for formation of a cathode or active electrode layer (e.g., cathode layers 602, 604 of FIG. 6); and a topside current collector mask 1112 used for formation of a topside current collector (e.g., topside current collectors 702, 704 of FIG. 7). The utilization of shadow masks is further discussed in in commonly owned U.S. patent application Ser. No. 16/238,389, filed on Jan. 2, 2019 and titled "Through Silicon Via Energy Storage Devices".

It should be noted that in at least some embodiments, that the electrochemically active energy storage components of the energy storage devices may be combined with two separate spalling components. Each independently spalled component may include one opposing half of the entire energy storage device. Each spalled half's top-most layer may be similar in chemical makeup and formulation (e.g., both independent top layers are pure semi-solid electrolyte). These two spalled layers may be pressed together so that they are enclosed within an energy storage housing unit once the two top-most layers touch. Then thermal/mechanical forces may be applied to chemically/physically induce cross-linking of the two independent spalled components. This creates an energy storage housing unit, which may be a contained and hermetically sealed fully solid or semi-solid energy storage device. In should also be noted that epoxy, polymers, thermal/mechanical alterable polymer materials, conductive polymers, etc. may be utilized at any juncture during construction of the energy storage device in order to maintain environmental protection, leakage mitigation and/or conductive capability.

It should be noted that although the above discussion lists or illustrates specific conditions and describes the scope of possibilities behind material formulation and integration processes of independently combined active and inactive energy storage layers, the various combinations of material formulation and integration conditions (illustrated herein via composite ratios, mechanical/thermal treatment, etc.) enables a viable pathway for advancement of the above listed capabilities in all-solid state energy storage devices.

Figure 12:
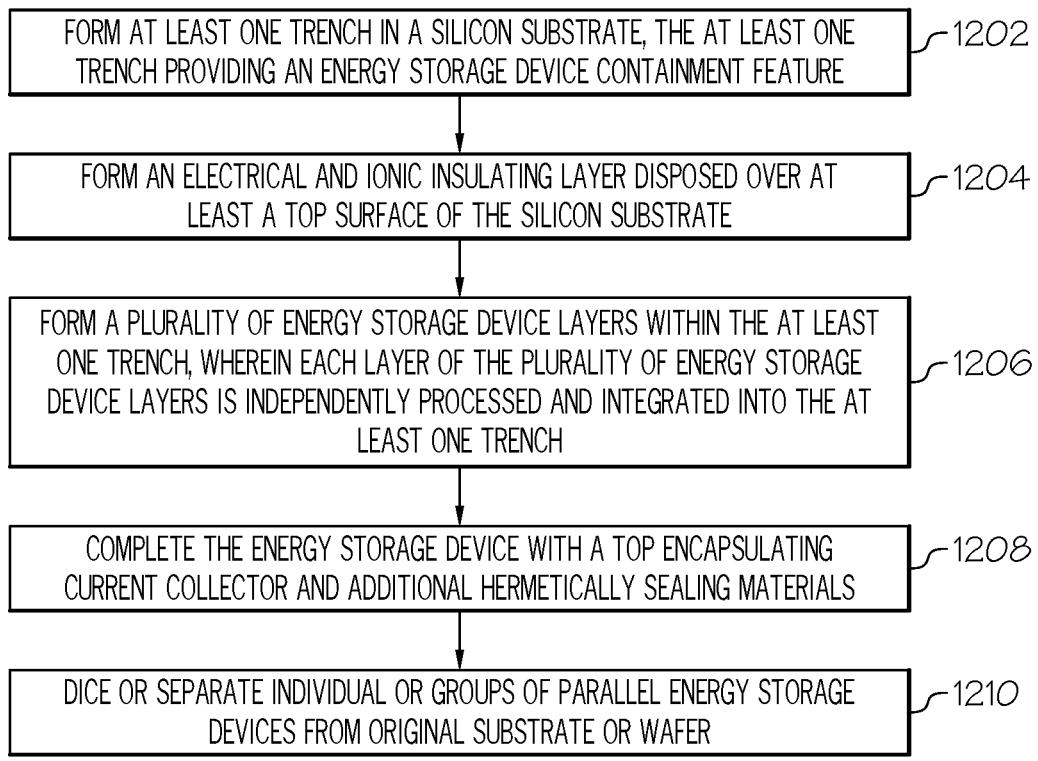
FIG. 12 is an operational flow diagram illustrating one example of a process for forming a semiconductor structure comprising an energy storage device containment feature according one embodiment of the present disclosure.

FIG. 12 is an operational flow diagram illustrating one example of a process for forming an energy storage device. It should be noted that each of the steps shown in FIG. 12 has been discussed in greater detail above with respect to FIGS. 1-11. At least one trench, at step 1202, is formed in a silicon substrate. The at least one trench provides an energy storage device containment feature. An electrical and ionic insulating layer, at step 1204, is formed and disposed over at least a top surface of the silicon substrate. A plurality of energy storage device layers, at step 1206, is formed within the at least one trench. Each layer of the plurality of energy storage device layers is independently processed and integrated into the at least one trench. The energy storage device(s), at step 1208, is completed by forming a top encapsulating current collector and additional hermetically sealing materials. Individual or groups of parallel energy storage devices, at step 1210, are diced or separated from the original wafer substrate.

The present disclosure may include a design for an integrated circuit chip, which may be created in a graphical computer programming language and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Although specific embodiments have been disclosed, those having ordinary skill in the art will understand that changes can be made to the specific embodiments without departing from the spirit and scope of the disclosure. The scope of the disclosure is not to be restricted, therefore, to the specific embodiments, and it is intended that the appended claims cover any and all such applications, modifications, and embodiments within the scope of the present disclosure.

It should be noted that some features of the present disclosure may be used in one embodiment thereof without use of other features of the present disclosure. As such, the foregoing description should be considered as merely illustrative of the principles, teachings, examples, and exemplary embodiments of the present disclosure, and not a limitation thereof.

Also note that these embodiments are only examples of the many advantageous uses of the innovative teachings herein. In general, statements made in the specification of the present application do not necessarily limit any of the various claimed disclosures. Moreover, some statements may apply to some inventive features but not to others.

What is claimed is:

1. A semiconductor device structure comprising:
   a silicon substrate having at least one trench disposed therein, the at least one trench providing an energy storage device containment feature;
   an electrical and ionic insulating layer comprising a first portion disposed over a top surface of the silicon substrate and a second portion in contact with sidewalls of the at least one trench; and
   a plurality of energy storage device layers within the at least one trench, wherein each energy storage device layer of the plurality of energy storage device layers is in direct contact with the second portion of the electrical and ionic insulating layer, the plurality of energy storage device layers comprising at least a composite cathode-based active electrode having a thickness of at least 100 nm and an internal resistance of less than 150 Ohms/cm$^2$.

2. The semiconductor device structure of claim 1, wherein the plurality of energy storage device layers further comprises at least:
   an anode-based active electrode;
   an electrolyte layer disposed over the anode-based active electrode, wherein the electrolyte layer is comprised of a material having an initial powder-based composition comprising a glass transition state; and
   a current collector layer disposed over the composite cathode-based active electrode.

3. The semiconductor device structure of claim 1, wherein the composite cathode-based active electrode comprises one or more of:
   a first layer comprising 90% electrolyte material, where a remainder of the first layer is comprised of at least one of cathode active material or electrically conductive material;
   a second layer comprising 80% electrolyte material, where a remainder of the second layer is comprised of at least one of cathode active material or electrically conductive material;
   a third layer comprising 60% electrolyte material, where a remainder of the third layer is comprised of at least one of cathode active material or electrically conductive material;
   a fourth layer comprising 40% electrolyte material, where a remainder of the fourth layer is comprised of at least one of cathode active material or electrically conductive material;
   a fifth layer comprising 20% electrolyte material, where a remainder of the fifth layer is comprised of at least one of cathode active material or electrically conductive material;
   a sixth layer comprising 10% electrolyte material, where a remainder of the sixth layer is comprised of at least one of cathode active material or electrically conductive material; and
   a seventh layer or layers comprising 0% electrolyte material, where a remainder of the seventh layer is comprised of at least one of cathode active material or electrically conductive material.

4. The semiconductor device structure of claim 1, further comprising:
   one or more vias formed within a base of the at least one trench, wherein each via of the one or more vias comprises metal material.

5. The semiconductor device structure of claim 1, further comprising an encapsulation layer disposed over the first portion of the electrical and ionic insulating layer.

6. The semiconductor device structure of claim 5, wherein the encapsulation layer is co-planar with a current collector layer disposed over the plurality of energy storage device layers.

7. The semiconductor device structure of claim 5, further comprising a current collector layer disposed over the plurality of energy storage device layers.

8. The semiconductor device structure of claim 7, wherein a first portion of the current collector layer extends below a top surface of the silicon substrate and a second portion of the current collector layer extends above the top surface of the silicon substrate.

9. The semiconductor device structure of claim 7, wherein the plurality of energy storage device layers comprises a charge hosting material layer in contact with the silicon substrate and an anode material layer disposed on and in contact with the charge hosting material layer.

10. The semiconductor device structure of claim 7, wherein the plurality of energy storage device layers comprises a charge hosting material layer in contact with an anode material layer.

11. The semiconductor device structure of claim 10, further comprising a current collector layer disposed over and in contact with the charge hosting material layer.

12. A semiconductor device structure comprising:
- a silicon substrate having at least one trench disposed therein, the at least one trench providing an energy storage device containment feature;
- an electrical and ionic insulating layer comprising a first portion disposed over a top surface of the silicon substrate and a second portion in contact with sidewalls of the at least one trench; and
- a plurality of energy storage device layers within the at least one trench and in contact with the second portion of the electrical and ionic insulating layer, the plurality of energy storage device layers comprising a layer in direct contact with the silicon substrate and also comprising at least a composite cathode-based active electrode.

* * * * *